US012789256B2

(12) United States Patent
Chaudhary et al.

(10) Patent No.: US 12,789,256 B2
(45) Date of Patent: Nov. 10, 2026

(54) ADDITIVE MANUFACTURING PROCESS MONITORING AND CALIBRATION

(71) Applicant: Applied Optimization, Inc., Fairborn, OH (US)

(72) Inventors: Anil Chaudhary, Fairborn, OH (US); Ethan Van Tilberg, Fairborn, OH (US); Andrew Volk, Fairborn, OH (US); Brandon Baucher, Fairborn, OH (US); Alex Istrate, Fairborn, OH (US)

(73) Assignee: Applied Optimization, Inc., Fairborn, OH (US)

( * ) Notice: Subject to any disclaimer, the term of this patent is extended or adjusted under 35 U.S.C. 154(b) by 53 days.

(21) Appl. No.: 18/429,886

(22) Filed: Feb. 1, 2024

(65) Prior Publication Data

US 2024/0269746 A1 Aug. 15, 2024

Related U.S. Application Data

(60) Provisional application No. 63/445,468, filed on Feb. 14, 2023.

(51) Int. Cl.

*B22F 10/31* (2021.01)
*B22F 12/49* (2021.01)

(Continued)

(52) U.S. Cl.

CPC .............. *B22F 10/31* (2021.01); *B22F 12/49* (2021.01); *B22F 12/90* (2021.01); *B33Y 30/00* (2014.12); *B33Y 50/02* (2014.12)

(58) Field of Classification Search

CPC ......... B22F 10/31; B33Y 30/00; B33Y 50/02; B33Y 10/00; B29C 64/393

See application file for complete search history.

(56) References Cited

U.S. PATENT DOCUMENTS

| | | | |
|---|---|---|---|
| 4,872,756 | A | 10/1989 | Hill |
| 10,112,262 | B2 | 10/2018 | Cheverton et al. |

(Continued)

OTHER PUBLICATIONS

Carnegie Mellon University and Applied Optimization, Inc. selected for awards under the Modelling Challenge for Additive Manufacturing; America Makes; NCDMM; 3 pages.

(Continued)

*Primary Examiner* — Thanh Luu

(74) *Attorney, Agent, or Firm* — Taft Stettinius & Hollister LLP

(57) ABSTRACT

An exemplary system generally includes an additive manufacturing machine, an optics assembly, a first sensor, a second sensor of a different configuration from the first sensor, and a controller. The additive manufacturing machine is configured to selectively scan a build beam across a region of interest to thereby add material to a workpiece at a moving build point located in the region of interest. The optics assembly is configured to separate electromagnetic radiation emitted from the region of interest into a first beam and a second beam. The first sensor is configured to receive the first beam and to generate first information related to the first beam. The second sensor is configured to receive the second beam and to generate second information related to the second beam. The controller is configured to calibrate the second sensor based upon the first information and the second information.

22 Claims, 9 Drawing Sheets

(51) Int. Cl.
*B22F 12/90* (2021.01)
*B33Y 30/00* (2015.01)
*B33Y 50/02* (2015.01)

(56) References Cited

U.S. PATENT DOCUMENTS

| | | | | |
|---|---|---|---|---|
| 10,569,364 | B2 | 2/2020 | Shi et al. | |
| 10,821,508 | B2 | 11/2020 | Cheverton et al. | |
| 10,845,459 | B2 | 11/2020 | Bruder et al. | |
| 10,914,677 | B2 | 2/2021 | Gold et al. | |
| 2011/0114839 | A1 | 5/2011 | Stecker et al. | |
| 2015/0092043 | A1 | 4/2015 | Baribault | |
| 2015/0375456 | A1* | 12/2015 | Cheverton | B33Y 50/02 425/169 |
| 2018/0071999 | A1 | 3/2018 | Karlen | |
| 2018/0154443 | A1 | 6/2018 | Milshtein et al. | |
| 2018/0194064 | A1 | 7/2018 | Chen et al. | |
| 2018/0246321 | A1 | 8/2018 | Campton et al. | |
| 2018/0369918 | A1 | 12/2018 | Gold | |
| 2019/0101489 | A1 | 4/2019 | Darwin | |
| 2019/0134748 | A1 | 5/2019 | Roychowdhury et al. | |
| 2019/0283332 | A1 | 9/2019 | Brown et al. | |
| 2020/0147868 | A1 | 5/2020 | Gold | |
| 2020/0391291 | A1 | 12/2020 | Herzog et al. | |
| 2021/0023654 | A1 | 1/2021 | Norman | |
| 2021/0039167 | A1 | 2/2021 | Ashton et al. | |
| 2021/0046546 | A1 | 2/2021 | Madigan et al. | |
| 2021/0162509 | A1 | 6/2021 | Ferrar et al. | |
| 2022/0143704 | A1* | 5/2022 | Tran | B23K 26/082 |
| 2022/0324026 | A1* | 10/2022 | Beckett | B33Y 50/02 |
| 2023/0394649 | A1* | 12/2023 | McCarthy | B22F 10/80 |

OTHER PUBLICATIONS

Sarah K. Everton; Review of In-Situ Process Monitoring and In-Situ Metrology for Metal Additive Manufacturing; Elsevier; Materials and Design; 2016; 15 pages; vol. 95.

Qilin Guo et al.; Transient Dynamics of Powder Spattering in Laser Powder Bed Fusion Additive Manufacturing Process Revealed by In-Situ High-Speed High-Energy X-Ray Imaging; Elsevier; Acta Materialia; 2018; 13 pages; vol. 151.

A.V. Gusarov et al.; Radiation Transfer in Metallic Powder Beds Used in Laser Processing; Elsevier; Journal of Quantitative Spectroscopy & Radiative Transfer; 2010; 11 pages; vol. 111.

Dongming Hu et al.; Sending, Modeling and Contgrol for Laser-Based Additive Manufacturing; Pergamon; International Journal of Machine Tools & Manufacture; 2003; 10 pages; vol. 43.

Abdalla R. Nassar et al.; Intra-Layer Closed-Loop Control of Build Plan During Directed Energy Additive Manufacturing of Ti-6A1-4V; Elsevier; Additive Manufacturing; 2015; 14 pages; vol. 6.

Lore-Anne Ponirakis; Feed-Forward Controls for Laser Powder Bed Fusion Based Metal Additive Manufacturing; Navy SBIR; 2018; 2 pages.

Thomas G. Spears et al.; In-Process Sensing in Selective Laser Melting (SLM) Additive Manufacturing; Integrating Materials and Manufacturing Innovation; 2016; 26 pages; vol. 5 No. 2.

Jonathan Stef et al.; Mechanism of Porosity Formation and Influence on Mechanical Properties in Selective Laser Melting of Ti-6A1-4V Parts; Elsevier; Materials and Design; 2018; 14 pages; vol. 156.

John C. Steuben et al.; Enriched Analytical Solutions for Additive Manufacturing Modeling and Simulation; Elsevier; Additive Manufacturing; 2019; 12 pages; vol. 25.

Qian Wang et al.; Model-Based Feedforward Control of Laser Powder Bed Fusion Additive Manufacturing; Elsevier; Additive Manufacturing; 2020; 14 pages; vol. 31.

* cited by examiner

ADDITIVE MANUFACTURING PROCESS MONITORING AND CALIBRATION

CROSS-REFERENCE TO RELATED APPLICATIONS

The present application claims the benefit of US Provisional Patent Application No. 63/445,468, filed Feb. 14, 2023, the contents of which are incorporated by reference in their entirety.

TECHNICAL FIELD

The present disclosure generally relates to additive manufacturing, and more particularly but not exclusively relates to systems and methods for monitoring additive manufacturing processes and/or calibrating a sensor in association with such monitoring.

BACKGROUND

Metal additive manufacturing (AM) now constitutes a several-billion-dollar market size. Notably, AM has been adopted for production of high-value aerospace, defense, and medical components. However, there remain concerns regarding repeatable production of high quality, defect-free components. To this end, in situ sensing has been proposed as a means towards measuring process physics and associated build quality.

Unfortunately, there remain significant barriers related to in situ process monitoring and the development of metrics to characterize the quality of AM parts. Monitoring process physics may require in situ sensing throughout the entire build at the interlayer, intralayer, and melt pool levels. Achieving fidelity at these three scales requires high-resolution, a large field of view (FOV), and a fast data rate. These specifications are largely unachievable by off-the-shelf in situ sensors. Single-point detectors, such as photodiodes or pyrometers, are capable of recording high-resolution data at fast rates, however their FOV is restricted. Large FOV can be achieved with visible or infrared camera systems, however, the vast amount of data limits the rate at which data can be recorded. Thus, solutions to monitoring the entirety of the build process, lie either with the use of multiple sensors operating at differing resolutions and frame rates, or the use of high-fidelity, high-speed sensors.

While high-fidelity laboratory-scale sensors, such as high-speed visible (VIS), infrared (IR), or X-ray imaging, have been recently adapted to elucidate AM process physics, their high cost, limited field of view, and extreme data rates inhibit their use with commercially-available hardware and software systems, and limit their use to simplified experiments in laboratory settings. For instance, while synchrotron X-ray imaging has been widely used to capture process dynamics for AM processes, experiments are limited to idealized environments (e.g., measurement of a single powder layer between two glassy carbon windows). High-speed VIS and IR imaging, which can be used to evaluate melt pool surface geometry and map complex process interactions, are also limited to a small field of view for the melt pool, due to limitations associated with commercially available resolution, capture rates, and data transfer requirements. Simply stated, these approaches are difficult to apply for the simplest of experiments (e.g. single tracks) and are neither scalable nor appropriate for validating quality of AM parts.

Monitoring AM processes with multiple sensors, however, poses its own list of complications. Namely, the introduction of multiple sensors implies variations in sensor-to-sensor viewing angle and FOV. These variations often require careful calibration for each sensor and increase the complexity to cross-register, associate, and validate the data collected by the simultaneous in situ sensing because the signals being measured are commonly a joint function of the sensing location on the build plane and its viewing angle.

Similar limitations apply to characterizing the AM process physics. Modeling the physics for interlayer, intralayer, and melt pool behavior is fundamentally different from each other in terms of the algorithms and boundary conditions. In addition, the powder recoat is a statistical process, the physics of laser-material interaction is complex, and high-temperature thermophysical data can lack fidelity. Thus, many methods to model the AM process physics use multi-scale, multi-physics approach, which includes a sequence of solutions at each time step.

Ultimately, the calibration of sensor data with process physics to characterize the AM part quality may require a multi-scale approach. A fundamental problem is therefore a mismatch of spatial resolution, temporal resolution, and fidelity. As such, there is a need for the integration and applications of methods to facilitate repeatable calibration between multi-scale in situ process monitoring sensors and AM part quality. For these reasons among others, there remains a need for further improvements in this technological field.

SUMMARY

An exemplary system generally includes an additive manufacturing machine, an optics assembly, a first sensor, a second sensor of a different configuration from the first sensor, and a controller. The additive manufacturing machine is configured to selectively scan a build beam across a region of interest to thereby add material to a workpiece at a moving build point located in the region of interest. The optics assembly is configured to separate electromagnetic radiation emitted from the region of interest into a first beam and a second beam. The first sensor is configured to receive the first beam and to generate first information related to the first beam. The second sensor is configured to receive the second beam and to generate second information related to the second beam. The controller is configured to calibrate the second sensor based upon the first information and the second information.

DETAILED DESCRIPTION OF ILLUSTRATIVE EMBODIMENTS

Figure 1:
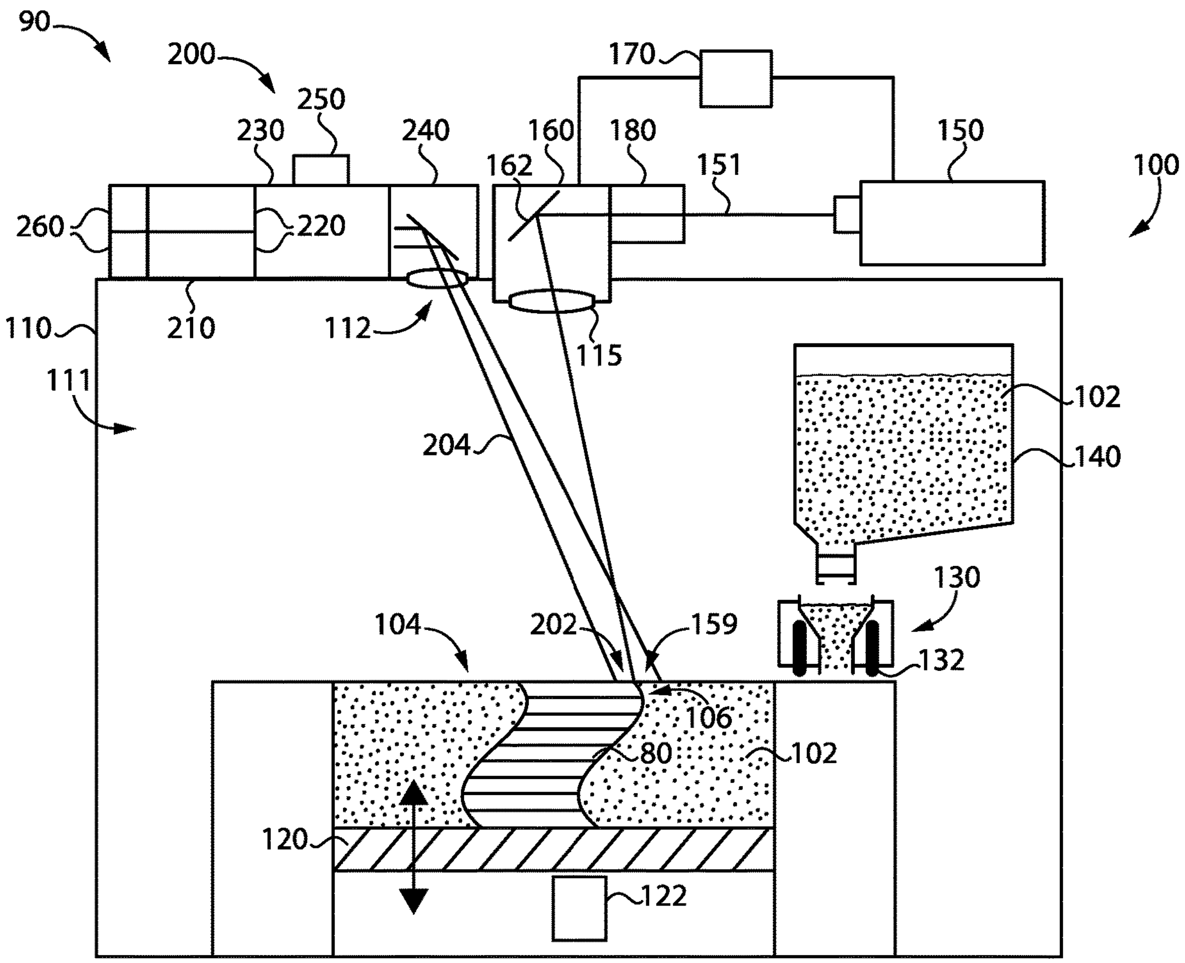
FIG. 1 is a schematic illustration of an additive manufacturing system including a monitoring assembly according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is an additive manufacturing system 90 according to certain embodiments. The system 90 generally includes a conventional additive manufacturing (AM) machine 100 and a modular add-on monitoring assembly 200 according to certain embodiments. As described herein, the AM machine 100 is configured to manufacture a workpiece 80 in a layer-by-layer fashion by scanning an energy beam 151 across a build plane 104 including one or more layers of powdered material 102, and the monitoring assembly 200 is configured to monitor the scanning via two or more optical sensors 260.

The AM machine 100 generally includes a housing 110, a build table 120 positioned in the housing 110, a powder distributor 130 operable to distribute powder 102 across the build table 120 to define a build plane 104, a reservoir 140 that provides powder 102 to the powder distributor 130, an energy beam generator 150 operable to generate an energy beam 151, a mirror galvanometer 160 operable to redirect the energy beam 151 onto the build plane 104 to thereby create an illumination point 159, and a control system 170 that controls operation of the AM machine 100. In certain embodiments, the AM machine 100 further includes an optics assembly 180 through which the energy beam 151 passes prior to reflection by the galvanometer 160.

The housing 110 defines a chamber 111 in which the build table 120 is positioned, and includes a first window 112 and a second window 115. The build plane 104 is visible via the first window 112, and, as described herein, a portion of the monitoring assembly 200 is positioned in the vicinity of the first window 112 such that electromagnetic (EM) radiation (e.g., visible light, IR rays, ultraviolet light, and/or X-rays) are able to enter the monitoring assembly 200 via the first window 112. The build plane 104 is also visible via the second window 115, and the mirror galvanometer 160 directs the energy beam 151 onto the build plane 104 to create the illumination point 159.

The build table 120 supports the workpiece 80 and the surrounding powder 102, and is operably coupled with an actuator 122 operable to move the build table 120 vertically. The actuator 122 may move the build table 120 under control of the control system 170 and may, for example, comprise a motor or hydraulic cylinder. As described herein, after a particular layer of powder 102 has been scanned by the energy beam 151, the build table 120 lowers by the thickness of each powder layer to accommodate the subsequent layer to be distributed by the powder distributor 130.

The powder distributor 130 is configured to distribute powder 102 across the top layer once the build table 120 has been lowered by the appropriate vertical displacement. The powder distributor 130 receives powder 102 from the reservoir 140, and moves along the build plane 104 to distribute the powder 102 to thereby create a new powder layer. The powder distributor 130 may, for example, be under the control of the control system 170. In certain embodiments, the powder distributor 130 may include one or more levelers 132, such as blades or rollers, which may aid in ensuring that the powder 102 is distributed evenly across the build plane 104.

The reservoir 140 holds the powder 102 to be distributed by the powder distributor 130, and fills the powder distributor 130 when appropriate. In the illustrated embodiment, the powder 102 comprises metal powder. Additionally or alternatively, the powder 102 may comprise another form of powder, such as ceramic powder.

The energy beam generator 150 is configured to generate the energy beam 151 with a power sufficient to melt the powder 102 at and around the illumination point 159, thereby creating a melt pool 106 that subsequently hardens to form a part of the workpiece 80. The illumination point 159 may thus alternatively be referred to as the build point 159. In the illustrated form, the energy beam generator 150 is provided in the form of a laser generator, and the energy beam 151 is provided in the form of a laser beam. It is also contemplated that the beam 151 may be provided as another form of energy beam (e.g., an electron beam), and that the energy beam generator 150 may be configured to generate such other form of energy beam.

The mirror galvanometer 160 includes a mirror 162, and is configured to move the mirror 162 to direct the energy beam 151 across the build plane 104 under control of the control system 170. More particularly, the control system 170 controls the mirror galvanometer 160 to direct the energy beam 151 based on a model of the workpiece 80 to build the workpiece 80 according to the model.

The control system 170 controls various aspects of the building of the workpiece 80, such as the movement of the build table 120, the distribution of the powder 102 by the powder distributor 130, and the direction of the energy beam 151 by the mirror galvanometer 160. Certain exemplary features that may be associated with the control system 170 are provided below with reference to FIG. 10.

As noted above, the AM machine 100 may include an optics assembly 180 through which the beam 151 passes prior to reflection by the galvanometer 160. This optics assembly 180 may, for example, include filters and/or lenses to condition the beam 151, e.g., by removing or suppressing particular wavelengths.

In the illustrated form, the AM machine 100 is provided in the form of a laser powder bed fusion additive manufacturing machine. It should be appreciated, however, the monitoring assembly 200 described herein may be used in connection with other forms of additive manufacturing machines, including but not limited to stereolithography AM machines, material jetting AM machines, binder jetting AM machines, directed energy deposition AM machines, and wire-fed AM machines.

As one example, the AM machine 100 may be provided in the form of a stereolithography AM machine in which layers of the workpiece 80 are iteratively generated by scanning an energy beam (e.g., an ultraviolet beam) across a photocurable resin. In such forms, the beam 151 may be an ultraviolet beam, and the build point 159 may be the point at which the ultraviolet beam strikes the photocurable resin.

As another example, the AM machine 100 may instead be provided in the form of a material jetting AM machine in which layers of the workpiece are iteratively generated by scanning a beam or jet of building material across the region of interest to build the workpiece. In such forms, the jet of building material may be considered to provide the build beam 151, and the build point 159 may be the point at which the build beam 151 intersects the region of interest to build the workpiece 80. Similarly, the AM machine may be provided in the form of a binder jetting AM machine in which layers of the workpiece are iteratively generated by scanning a beam or jet of binder across the build plane to bind previously-deposited material, thereby building the workpiece. In such forms, the jet of binder may be considered to provide the build beam 151, and the build point 159 may be the point at which the binder jet strikes the deposited material to build the workpiece 80.

As should be evident from the foregoing, the build beam 151 may be provided in many different forms, including but not limited to the form of an energy beam (e.g., a laser beam, an electron beam, or an ultraviolet beam) or a jet of build material or binder. Thus, embodiments of the moving build point 159 are not limited to an illumination point, but may also encompass at which build material or binder are deposited on the workpiece 80. Moreover, embodiments of the region of interest are not limited to the build plane 104, but may also encompass a three-dimensional region of interest (e.g., in embodiments in which the AM machine is provided in the form of a material deposition AM machine).

Figure 2:
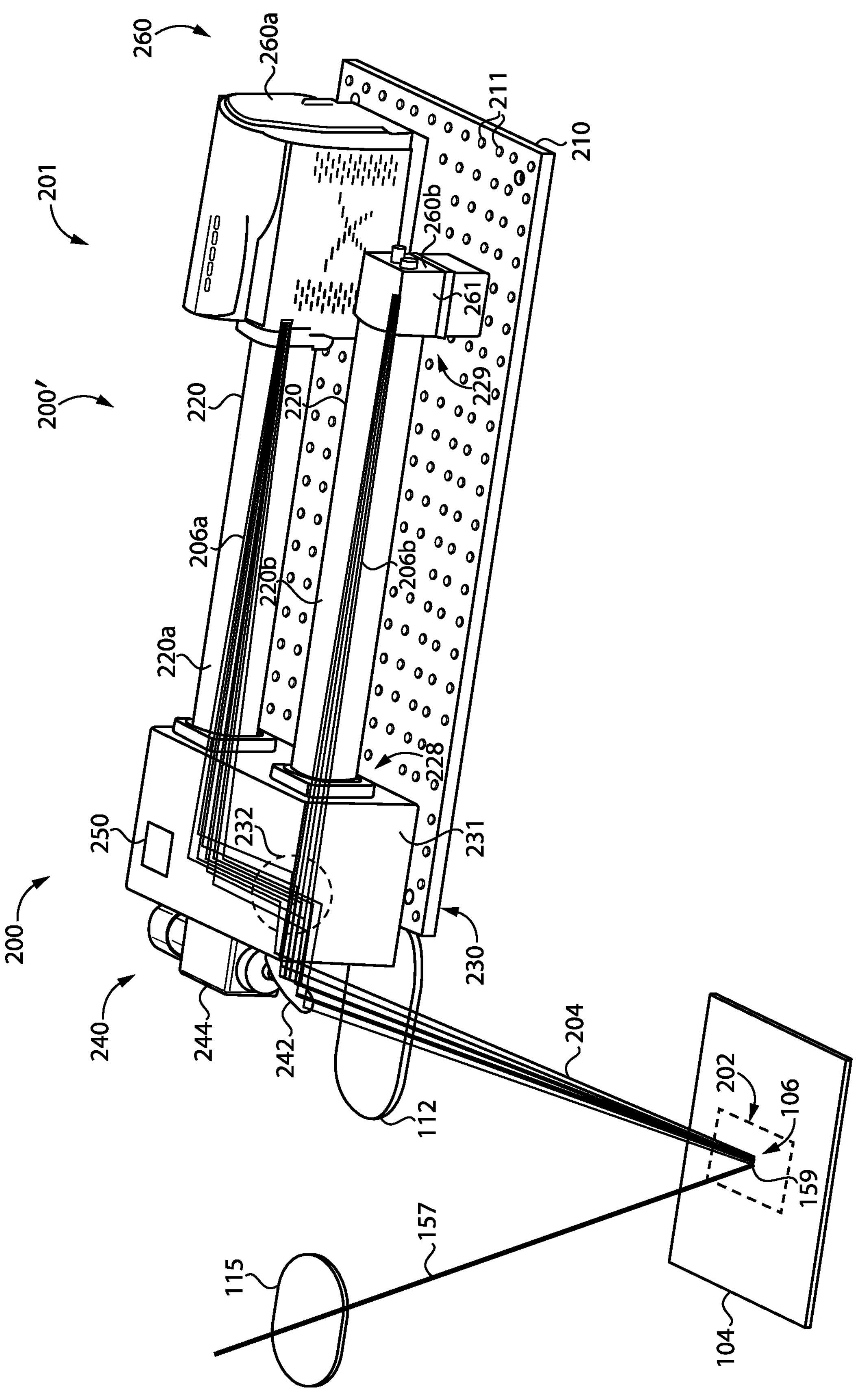
FIG. 2 is a perspective illustration of the monitoring assembly.
Figure 3:
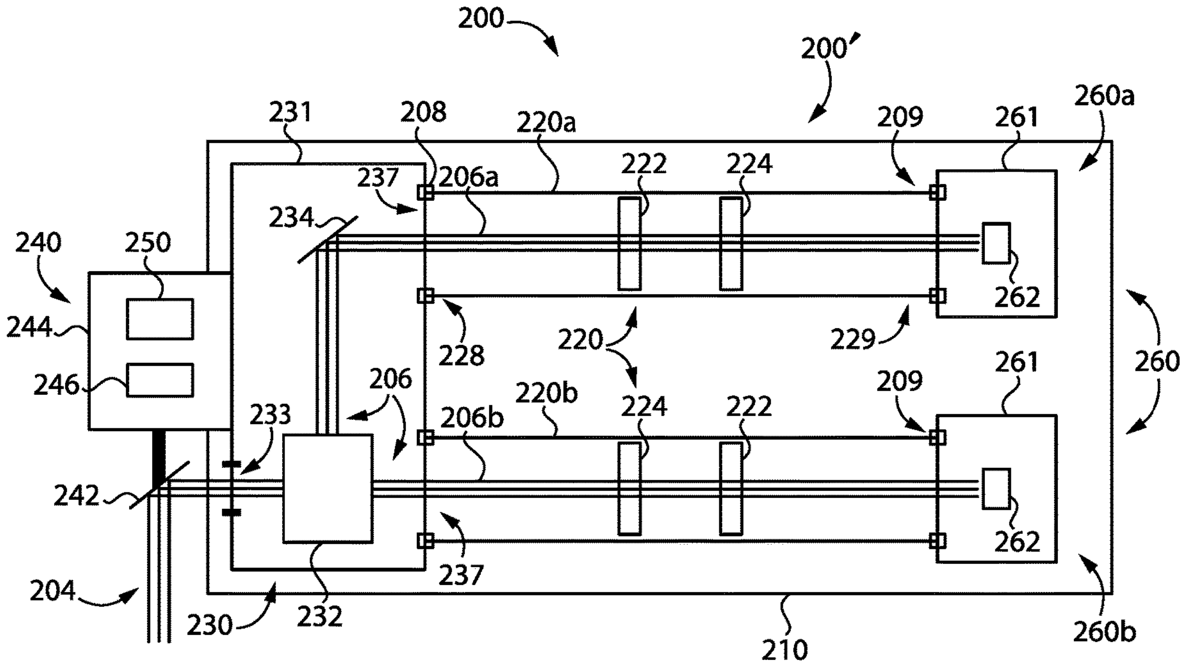
FIG. 3 is a schematic illustration of the monitoring assembly.

With additional reference to FIGS. 2 and 3, the monitoring assembly 200 is mounted to the housing 110 in the vicinity of the first window 112, and generally includes a base plate 210, a plurality of lens benches 220 mounted to the base plate 210, an optics assembly 230 mounted to the base plate 210, a movable reflector 240 configured to reflect electromagnetic radiation from within a field of view (FOV) 202 to the optics assembly 230, a controller 250 configured to move the movable reflector 240 to maintain a predetermined relationship between the illumination point 159 and the FOV 202, and a plurality of optical sensors 260, each of which may be coupled to a corresponding one of the lens benches 220. As described herein, the optics assembly 230 includes a beam splitter 232 that splits the electromagnetic (EM) radiation 204 received from the movable reflector 240 into a plurality of beams 206, each of which is directed along a corresponding lens bench 220 to a corresponding optical sensor 260.

In certain forms, one or more components of the monitoring assembly 200 may be provided with the AM machine 100 at the time of sale of the AM machine 100. In such forms, the controller 250 may not necessarily be included, and the functions thereof may be performed by the control system 170. In certain embodiments, one or more components of the monitoring assembly 200 may be provided in an add-on kit 200' for an existing AM machine 100. Further details regarding each of these forms are provided herein.

The base plate 210 is configured for mounting to the housing 110 of the AM machine 100 at a location in the vicinity of the first window 112, and may include features that facilitate such mounting. For example, the base plate 210 may include one or more apertures 211 that align with corresponding mounting features formed in the housing 110 to facilitate mounting of the base plate 210 to the housing 110, for example via one or more threaded fasteners. In certain embodiments, such as those in which the monitoring assembly 200 is provided to the AM machine 100 at the time the machine 100 is manufactured, the base plate 210 may constitute a portion of the housing 110. In the illustrated form, the base plate 210 is further configured to facilitate the removable mounting of one or more other components of the monitoring assembly 200 to the base plate 210. For example, the apertures 211 may provide mounting locations for the lens benches 220 and/or the sensors 260.

The plurality of lens benches 220 includes at least a first lens bench 220*a* and a second lens bench 220*b*. Each of the lens benches 220 is configured to direct a corresponding beam 206 from the optics assembly 230 to the corresponding optical sensor 260, and may further be configured to condition the beam 206 in one or more manners. For example, one or more of the lens benches 220 may include one or more lenses 222 operable to focus the corresponding beam 206 and/or one or more filters 224 to remove or reduce one or more frequencies of electromagnetic radiation from the corresponding beam 206. In certain embodiments, one or more of the lens benches 220 may have an opaque layer that shields the interior of the lens bench 220 from external light.

Each lens bench 220 has a proximal end 228 adjacent the optics assembly 230 and an opposite distal end 229 adjacent the corresponding optical sensor 260. In the illustrated form, each proximal end 228 is removably coupled with a housing 231 of the optics assembly 230, and each distal end 229 is removably coupled with a housing 261 of the corresponding optical sensor 260. In certain embodiments, the proximal end 228 and/or the distal end 229 may include features that facilitate the removable coupling of the lens bench 220 with the corresponding component. In the illustrated form, the proximal ends 228 and the optics assembly housing 231 cooperate to define proximal mating fittings 208, and the distal ends 229 and the optical sensor housings 261 cooperate to define distal mating fittings 209. For example, each of the proximal end 228 and the distal end 229 may be threaded to facilitate threaded coupling with the housings 231, 261. It is also contemplated that one or both of the ends 228, 229 may not necessarily include mating fittings, or may include another form of quick coupling feature (e.g., bayonet coupling features, press fit coupling features, or other coupling features).

The optics assembly 230 includes a beam splitter 232, and in the illustrated form further includes a housing 231 and a pair of mirrors 234. The housing 231 is mounted to the base plate 210, and shields the internal components of the optics assembly 230 from interference by outside light. The housing 231 includes an inlet aperture 233 through which EM radiation 204 enters the optics assembly 230, and further includes a plurality of outlet apertures 237 by which the beams 206 exit the housing 231. In certain embodiments, the inlet aperture 233 and/or one or more of the outlet apertures 237 may be provided with a lens. In the illustrated form, each of the outlet apertures 237 interfaces with the corresponding lens bench 220 via quick connect fittings 208 as described above.

The beam splitter 232 is configured to split the electromagnetic radiation 204 reflected by the movable reflector 240 such that the EM radiation 204 emitted from the FOV 202 is split into a plurality of beams 206, including at least a first beam 206*a* and a second beam 206*b*. A portion of the optics assembly 230 (e.g., the beam splitter 232) may be configured to collimate the electromagnetic radiation such that the plurality of beams 206 are collimated beams. In certain embodiments, the beam splitter 232 may, for example, take the form of a dual-prism beam splitter or a half-silvered mirror. In certain embodiments, the beam splitter 232 may comprise a coating by which EM radiation is selectively reflected based upon the wavelength of the EM radiation. For example, the beam splitter 232 may reflect radiation that meets a particular criterion (e.g., exceeds a particular wavelength) to form the first beam 206*a*, while permitting radiation that does not meet the criterion (e.g., falls below the particular wavelength) to pass through the beam splitter 232 to form the second beam 206B.

In certain forms, the beam splitter 232 may be configured to split the EM radiation 204 into the plurality of beams 206 without regard to the frequency/wavelength of the EM radiation 204 being split such that each of the beams 206 is substantially identical. In the illustrated form, however, the beam splitter 232 is configured to split the EM radiation 204 based on the frequency/wavelength of the EM radiation 204 such that the first beam 206*a* and the second beam 206*b* comprise different wavelengths/frequencies of electromagnetic radiation. More particularly, the illustrated beam splitter 232 is configured to split the EM radiation 204 into a first beam 206*a* primarily comprising electromagnetic radiation in the infrared spectrum (IR) with wavelengths in the range of 0.75 μm to 15 μm, and a second beam 206*b* primarily comprising electromagnetic radiation in the visible spectrum (VIS) with wavelengths in the range of 380 nm to 750 nm.

In certain embodiments, the IR beam 206*a* may primarily comprise near infrared (NIR) with wavelengths in the range of 0.75 μm to 1.4 μm. In certain embodiments, the IR beam 206*a* may primarily comprise short-wavelength infrared (SWIR) with wavelengths in the range of 1.4 μm to 3 μm. In certain embodiments, the IR beam 206*a* may primarily comprise mid-wavelength infrared (MWIR) with wavelengths in the range of 3 μm to 8 μm. In certain embodiments, the IR beam 206*a* may primarily comprise long-wavelength infrared (LWIR) with wavelengths in the range of 8 μm to 15 μm. In certain embodiments, the IR beam 206*a* may comprise a combination including one or more of NIR radiation, SWIR radiation, MWIR radiation, and/or LWIR radiation.

While the illustrated beam splitter 232 is configured to split the EM radiation 204 into an IR beam 206*a* and a VIS beam 206*b*, it should be appreciated that the beam splitter 232 may instead be configured to split the EM radiation 204 into a different combination of beams. For example, the beam splitter 232 may be configured to split the EM radiation 204 into two or more beams, wherein one or more of the beams 206 primarily comprises ultraviolet radiation, VIS radiation, NIR radiation, SWIR radiation, MWIR radiation, and/or LWIR radiation, and another of the beams primarily comprises electromagnetic radiation in a frequency range different from the first beam. Additionally or alternatively, the optics assembly 230 and/or one or more of the lens benches may include optics (e.g., filters) that cause one or more of the beams 206 to primarily comprise ultraviolet radiation, VIS radiation, NIR radiation, SWIR radiation, MWIR radiation, and/or LWIR radiation when the beam enters the corresponding optical sensor 260.

As noted above, the illustrated optics assembly 230 includes a plurality of mirrors 234 that aid in directing the beams 206 along the corresponding lens benches 220. While the illustrated optics assembly 230 includes two mirrors 234, it should be appreciated that the optics assembly 230 may include more or fewer mirrors 234. In certain embodiments, the optics assembly 230 lacks mirrors 234, and the beams 206 travel directly from the beam splitter 232 to the corresponding lens benches 220. In certain embodiments, the optics assembly 230 may include additional or alternative devices that aid in conditioning the electromagnetic radiation passing therethrough, such as lenses and/or filters. In certain embodiments, such as those in which one or more of the lens benches 220 comprises one or more lenses 222 and/or one or more filters 224, such lens bench(es) 220 may be considered to comprise a portion of the optics assembly 230.

The movable reflector 240 generally includes a mirror 242 and an actuator 244 such as a scanning motor, which is configured to move the mirror 242 under control of the controller 250. The mirror 242 reflects the EM radiation 204 from the FOV 202 to the entrance of the optics assembly 230, where the EM radiation 204 is split into a plurality of beams 206. As noted above, each beam 206 travels along a corresponding lens bench 220 to a respective optical detector 260. As a result, each optical detector 260 is provided with electromagnetic radiation from the same FOV 202. While other forms are contemplated, in the illustrated embodiment, the movable reflector 240 is provided in the form of a mirror galvanometer.

Figure 4:
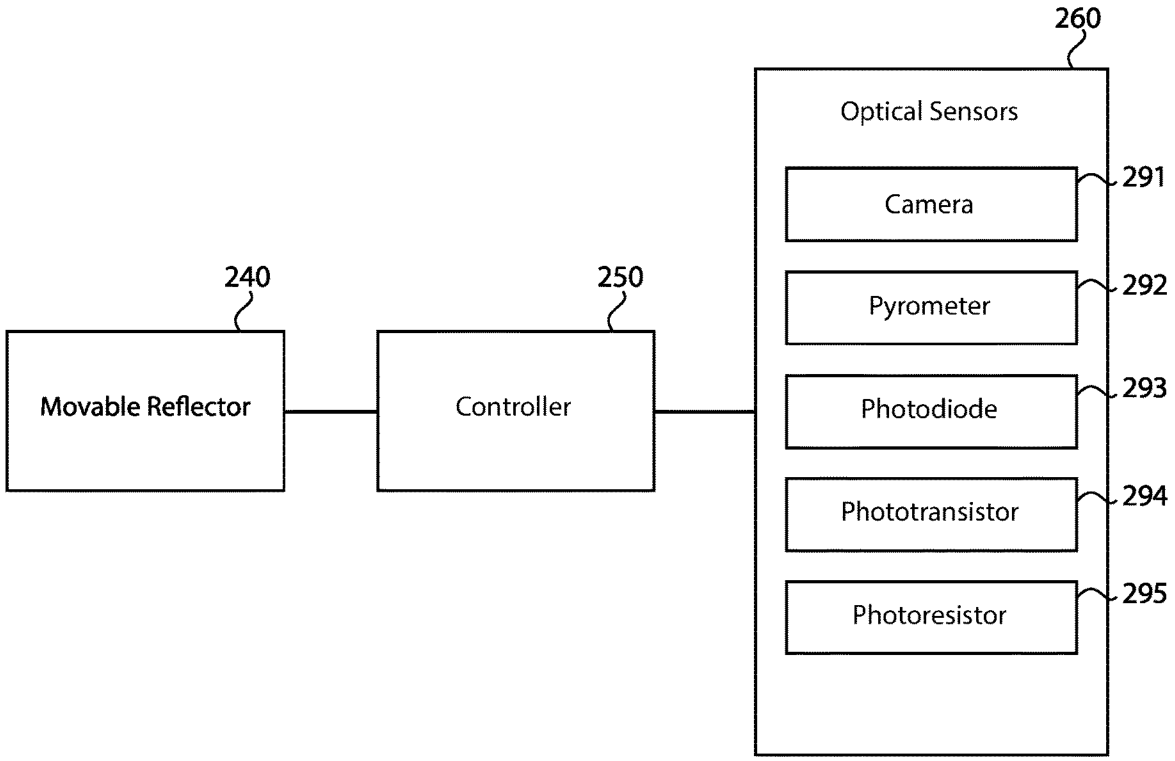
FIG. 4 is a schematic block diagram of the monitoring assembly.

With additional reference to FIG. 4, the controller 250 is in communication with the movable reflector 240 and is operable to control the movable reflector 240 such that the moving illumination point 159 maintains a predetermined relationship with the FOV 202 for the optical detectors 260. In certain embodiments, the controller 250 may further be in communication with one or more of the optical detectors 260 such that the controller 250 receives information generated by the optical detector(s) 260 with which the controller 250 is in communication. Further details regarding the control of the movable reflector 240 by the controller 250 are provided below with reference to FIG. 8.

The optical sensors 260 are provided at the distal ends 229 of the lens benches 220 such that each optical sensor 260 is positioned to receive the beam 206 directed along the corresponding lens bench 220. In the illustrated form, the plurality of optical sensors 260 includes a first optical sensor 260*a* positioned at the distal end 229 of the first lens bench 220*a* and operable to receive the first beam 206*a*, and a second optical sensor 260*b* positioned at the distal end 229 of the second lens bench 220*b* and operable to receive the second beam 206*b*. In the illustrated form, each optical sensor 260 includes a housing 261 and a sensing region 262 mounted within the housing 261. Each housing 261 is configured for coupling with the corresponding lens bench 220, either directly or via one or more adapters. For example, the housing 261 of the first optical sensor 260*a* may include a threaded region by which the housing 261 can be threadedly coupled with the distal end 229 of the first lens bench 220*a*. The housing 261 of the second optical sensor 260*b* may likewise include a threaded region by which the housing 261 can be threadedly coupled with the distal end 229 of the second lens bench 220*b*.

The sensing region 262 is configured to receive the corresponding beam 206, and each optical sensor 260 is configured to generate information based upon one or more characteristics of the beam 206 that illuminates the sensing region 262. In certain embodiments, the sensing region 262 may be a multi-pixel sensing region, for example in embodiments in which the optical sensor 260 is provided in the form of a camera. In such forms, the optical sensor 260 may generate digital images of the FOV 202 in response to the beam 206 striking the sensing region 262, and such digital images may have a resolution in at least the kilopixel range or at least the megapixel range. In certain embodiments, the sensing region 262 may not necessarily be pixelated, for example in embodiments in which the optical sensor 260 is provided in the form of a pyrometer. In such forms, the optical sensor 260 may generate value information (e.g., estimated temperature information) in response to the beam 206 striking the sensing region 262.

In certain embodiments, such as those in which the beams 206*a*, 206*b* are provided to the optical sensors 260 in different wavelength bands, the optical sensors 260 may be specifically configured to generate information related to such wavelength bands. For example, in embodiments in which the first beam 206*a* primarily comprises VIS radiation when received by the first sensor 260*a*, the first sensor 260*a* may be provided in the form of a visible light camera. As another example, in embodiments in which the second beam 206*b* primarily comprises MWIR radiation when received by the second sensor 260*b*, the second sensor 260*b* may be provided in the form of an MWIR camera. In certain forms, one or more of the optical sensors 260 may be selected from the group including a camera 291, a pyrometer 292, a photodiode 293, a phototransistor 294, and a photoresistor 295. In certain embodiments, one or more of the optical sensors 260 may have high spatial resolution. For example, a camera 291 may be provided with a resolution of one megapixel or greater, or of ten megapixels or greater.

As will be appreciated, the area of the FOV 202 sensed by the optical sensors 260 depends upon a number of factors, such as the size of the mirror 242, the degree of magnification provided by the optics assembly 230 (including any lenses 222 provided in the lens benches 220), and other factors. In order to provide for high spatial resolution of the FOV 202, it may be advantageous to provide the FOV 202, as sensed by the optical sensors 260, with a relatively small FOV 202. For example, the FOV 202 may have an area of 200 $mm^2$ or less. In certain embodiments, the FOV 202 may be provided in a square shape that is about 12 mm (e.g., 12 mm+/−10%) on each side. It should be appreciated, however, that other areas and geometries for the FOV 202 are contemplated.

Figure 5:
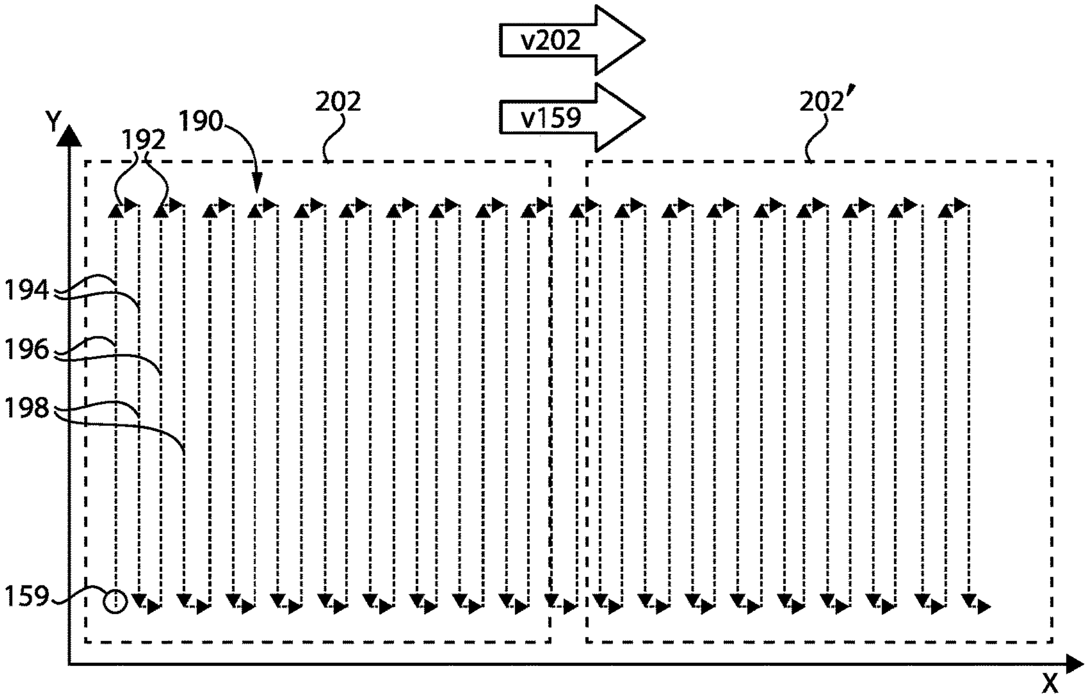
FIG. 5 is a simplified representation of a build path along which a build beam may travel during the manufacture of a workpiece.

With additional reference to FIG. 5, illustrated therein is a simplified example of a build path 190 along which the build point 159 travels during a first timeframe while building the workpiece 80. Also illustrated in FIG. 5 is a coordinate system including a Y-axis and an X-axis.

The illustrated build path 190 includes a plurality of tracks along which the build point 159 travels, including longitudinal or X-direction tracks 192 and lateral or Y-direction tracks 194. The lateral or Y-direction tracks 194 include Y+ tracks 196 extending in the positive Y direction and Y− tracks 198 extending in the negative Y direction. The illustrated build path 190 is a generally rectangular raster scan build path, in which each pair of adjacent lateral tracks 194 is connected by a corresponding longitudinal track 192. When traveling along the build path 190, the moving build point 159 travels along the first Y+ track 196 to the first longitudinal track 192, and then along the first Y− track to the second longitudinal track 192. The process may repeat for the first timeframe until the build path 190 has been completed.

While the illustrated build path 190 is provided as a simplified raster scan for purposes of illustration, it should be appreciated that more complex build paths may be utilized by the AM machine. For example, the tracks may not necessarily be aligned with the axes (e.g., may be oblique to the axes), and/or may include curvilinear portions, such as in the case that the AM machine 100 utilizes a vector scan build plan for at least a portion of the build.

In order to ensure that the build point 159 maintains a predetermined relationship with the FOV 202, the controller 250 may control the movable reflector 240 to move the FOV 202 with a FOV velocity v202 for at least a portion of the first timeframe. In certain forms, the FOV velocity v202 is selected based upon the average build point velocity v159. Those skilled in the art will readily recognize that, during the first timeframe, the Y-direction velocities of the lateral tracks generally cancel each other out such that the average velocity v159 of the build point 159 is a longitudinal or X-direction velocity. Thus, in the illustrated form, the controller 250 may control the movable reflector 240 to move the FOV 202 with a longitudinal FOV velocity v202.

As noted above, the controller 250 may be configured to control the movable reflector 240 to move the FOV 202 with a FOV velocity v202 to thereby maintain a predetermined relationship between the FOV 202 and the build point 159. In certain embodiments, maintaining the predetermined relationship between the FOV 202 and the build point 159 comprises maintaining the build point 159 within the FOV 202. In certain embodiments, maintaining the relationship between the FOV 202 and the build point 159 comprises maintaining the build point within or adjacent the FOV 202. In certain embodiments, maintaining the relationship between the FOV 202 and the build point 159 comprises maintaining the build point outside the FOV 202, for example to focus the FOV 202 on the tracks recently traveled by the build point 159. In certain embodiments, selecting the FOV velocity v202 based on the average build point velocity v159 comprises selecting the FOV velocity v202 as a predetermined percentage of the average build point velocity v159. In certain embodiments, the predetermined percentage is 100% such that the FOV velocity v202 is selected as the average build point velocity v159.

In order to maintain the predetermined relationship between the FOV 202 and the build point 159, it may be necessary or desirable for the controller 250 to track the build point 159. Several methods by which the build point 159 may be tracked are contemplated herein. In certain embodiments, the controller 250 may be provided with the build plan for the workpiece 80, and may control the movable reflector 240 based on the build plan. Such a build plan may correlate particular timeframes with particular average velocities for the build point 159. For example, the build plan may indicate that the build point 159 will move from a first identified location to a second identified location with a first average build point velocity v159 during a first timeframe. In such forms, the controller 250 may control the movable reflector 240 during at least a portion of the first timeframe to move the FOV 202 with a first FOV velocity v202 selected based upon the first average build point velocity v159 to thereby maintain the predetermined relationship between the FOV 202 and the build point 159.

In certain embodiments, the controller 250 may receive information from one or more of the optical detectors 260, and may control the movable reflector 240 based on information received from the optical detector(s) 260. For example, an optical detector 260 may be provided in the form of a camera, and the controller 250 may process information generated by the camera and control the movable reflector 240 in a manner that causes the build point 159 to maintain the predetermined relationship with the FOV 202 based on the information processed.

In certain embodiments, the controller 250 may be provided with the model by which the AM machine manufactures the workpiece 80 (e.g., a computer aided design or CAD model), and may control the movable reflector 240 based on the model. For example, the model may indicate to the controller 250 that the build point 159 will be in a particular location at a particular time, and the controller 250 may control the movable reflector 240 to ensure the presence of the predetermined relationship between the FOV 202 and the build point 159 at that particular time. Additionally or alternatively, the controller 250 may receive the information generated by the optical sensors 260 and register the information to the model. For example, the controller 250 may correlate the information generated by the optical sensors 260 with the model such that one or more points on the model are known to correspond to particular information generated by the optical sensors 260.

By way of illustration, point (X, Y, Z) on the model may be correlated with information generated by the optical sensors 260 at time t, and point (X', Y', Z') on the model may be correlated with time t'. If a defect is later found in the workpiece 80 at point (X, Y, Z), the information generated by the optical sensors at and/or around time t may be evaluated to determine the source of the defect. Such information may, for example, be useful in preventing and/or detecting future defects. As one example, if the information generated at and/or around time t exhibits an aberrant characteristic (e.g., a temperature flare/dip, an increase or decrease in electromagnetic radiation within one or more wavelength bands, etc.), such an aberrant characteristic may be indicative of a manufacturing anomaly leading to the defect. Thus, if the aberrant characteristic is again noted at time t', the presence of such an aberrant characteristic may be indicative of a defect at point (X', Y', Z') in the workpiece 80. As will be appreciated, such information may be useful not only in evaluating the presence or absence of defects in a particular workpiece 80, but also in detecting or predicting defects in other workpieces and/or conducting research into the process physics of the AM process.

Figure 6:
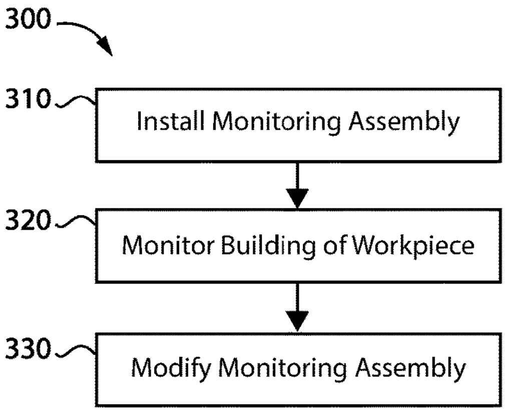
FIGS. 6-9 are schematic flow diagrams of processes according to certain embodiments.

With additional reference to FIG. 6, an exemplary process 300 that may be performed using the AM machine 100 and the monitoring system 200 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 300 is described herein with specific reference to the AM machine 100, monitoring system 200, and associated kit 200' illustrated in FIGS. 1-4, it is to be appreciated that the process 300 may be performed with AM machines, monitoring systems, and/or kits having additional or alternative features.

The illustrated process 300 may begin with block 310, which generally involves installing a monitoring assembly to an AM machine. Block 310 may, for example, involve installing the add-on kit 200' for the monitoring assembly 200 to the AM machine 100. Further details regarding an example process 400 for performing block 310 are provided below with reference to FIG. 7.

The illustrated process 300 includes block 320, which generally involves monitoring the building of a workpiece via a monitoring assembly installed to an AM machine. Block 320 may, for example, involve monitoring the building of the workpiece 80 via the monitoring assembly 200 installed to the AM machine 100. Further details regarding an example process 500 for performing block 320 are provided below with reference to FIG. 8.

The process 300 may further include block 330, which generally involves modifying the monitoring assembly. Block 330 may, for example, involve modifying the monitoring assembly 200 by replacing one or more interchangeable components of the monitoring assembly 200. Further details regarding an example process 600 for performing block 330 are provided below with reference to FIG. 9.

Figure 7:
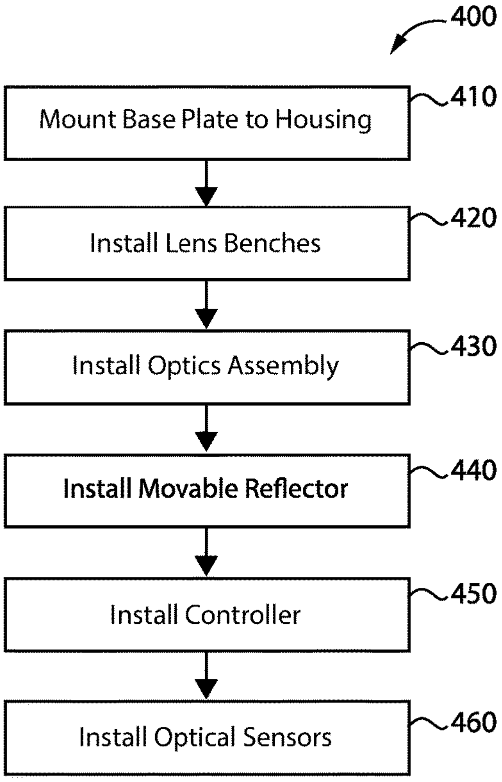

With additional reference to FIG. 7, an exemplary installation process 400 that may be performed using the illustrated add-on kit 200' is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Furthermore, while the process 300 is described herein with specific reference to the AM machine 100, monitoring system 200, and associated kit 200' illustrated in FIGS. 1-4, it is to be appreciated that the process 300 may be performed with AM machines, monitoring systems, and/or kits having additional or alternative features.

In certain embodiments, the process 400 may be performed in connection with the above-described process 300 to complete the installing of block 310. In certain embodiments, the process 400 may be performed to install a sensor assembly 200 to an AM machine 100 prior to sale of the AM machine 100 to provide the system 90 as an original construction. It is also contemplated that the process 400 may involve purchasing an add-on kit 200' for an existing AM machine 100, and installing the kit 200' to the machine in situ to form the system 90 as a retrofit system.

In certain embodiments, the process 400 may include block 410, which generally involves mounting the base plate 210 to the housing 110 of the AM machine 100 in the vicinity of the first window 112. In certain forms, block 410 may involve releasably mounting the base plate 210 to the housing 110, for example via one or more threaded fasteners. In certain forms, block 410 may involve permanently mounting the base plate 210 to the housing 110, for example via welding. In certain embodiments, such as those in which the system 90 is provided as an original (non-retrofit) system, block 410 may be omitted.

The illustrated process 400 includes block 420, which generally involves installing the lens benches 220. For example, block 420 may involve securing the proximal ends 228 of the lens benches 220 to the optics assembly housing 231. As noted above, The optics assembly housing 231 and/or the proximal ends 228 of the lens benches 220 may include one or more quick-connect fittings 208 that facilitate removable coupling of the lens benches 220 with the optics assembly housing 231. It is also contemplated that the lens benches 220 may be permanently secured to the optics assembly housing 231. As described herein, however, it may be preferable in certain embodiments for the lens benches 220 to be easily removable, for example to facilitate modification of the installed monitoring assembly 200.

The illustrated process 400 includes block 430, which generally involves installing the optics assembly 230. For example, block 430 may involve mounting the optics assembly 230 to the housing 110 via the base plate 210, either before or after the base plate 210 is mounted to the housing 110. It is also contemplated that block 430 may involve mounting the optics assembly 230 directly to the housing 110 in the vicinity of the first window 112. The optics assembly 230 installed in block 430 generally includes a beam splitter 232, and may further include one or more mirrors 234, one or more filters, and/or an optics assembly housing 231 that houses at least a portion of the optics assembly 230.

The illustrated process 400 includes block 440, which generally involves installing the movable reflector 240. For example, block 440 may involve mounting the movable reflector 240 to the optics assembly housing 231 such that the movable reflector 240 is in the vicinity of the inlet aperture 233 of the optics assembly housing 231. When the monitoring assembly 200 is fully installed to the AM machine 100, the movable reflector 240 is also in the vicinity of the first window 112 such that the mirror 242 is operable to reflect EM radiation 204 from the FOV 202 in the region of interest (e.g., on the build plane 104) to the inlet aperture 233 for splitting by the beam splitter 232.

The illustrated process 400 includes block 450, which generally involves installing the controller 250. Installing the controller 250 generally involves placing the controller 250 in communication with the actuator 244 such that the controller 250 is operable to control the movable reflector 240 to adjust the FOV 202 seen by the optics assembly 230 (and thus the optical sensors 260). In certain embodiments, block 450 may further involve placing the controller 250 in communication with one or more of the optical sensors 260 such that the controller 250 is operable to receive information generated by the optical sensors 260. In certain embodiments, such as those in which the system 90 is provided as an original construction, the monitoring assembly 200 may not necessarily have a dedicated controller 250, and may instead be controlled by the control system 170 of the AM machine 100. Alternatively, a dedicated controller 250 may be considered to comprise a portion of the AM machine control system 170.

The illustrated process 400 includes block 460, which generally involves installing the optical sensors 260. In the illustrated form, block 460 involves threadedly engaging the threaded portion of each optical sensor housing 261 with the threaded distal end 229 of the corresponding lens bench 220. Block 460 may further include releasably securing the optical sensor housings 261 to the AM machine housing 110, e.g., via the base plate 210. Those skilled in the art will readily recognize that optical sensors configured for use in laboratory environments often include housings with quick coupling features (e.g., threaded features) to facilitate the rapid coupling of the housing 261 with a lens tube. In providing the distal ends 229 of the lens benches 220 with corresponding threaded features, the systems and methods described herein may facilitate the installation of the optical sensors. It should be appreciated, however, that in certain embodiments one or more of the optical sensor housings 261 may be permanently secured with the corresponding lens bench 220.

With the process 400 complete, provided is a system 90 that includes the AM machine 100 and the sensor assembly 200. As noted above, the system 90 may be an original construction that includes both the AM machine 100 and the sensor assembly 200 at the time of sale, or the system 90 may be a retrofit system in which an existing AM machine 100 has been retrofit with an add-on kit 200' to provide the AM machine 100 with a sensor assembly 200. Moreover, while the installation process 400 may be utilized to perform block 310 of the above-described process 300, it is also contemplated that the installation process 400 may be performed in connection with other processes, or may be performed as a standalone process.

Figure 8:
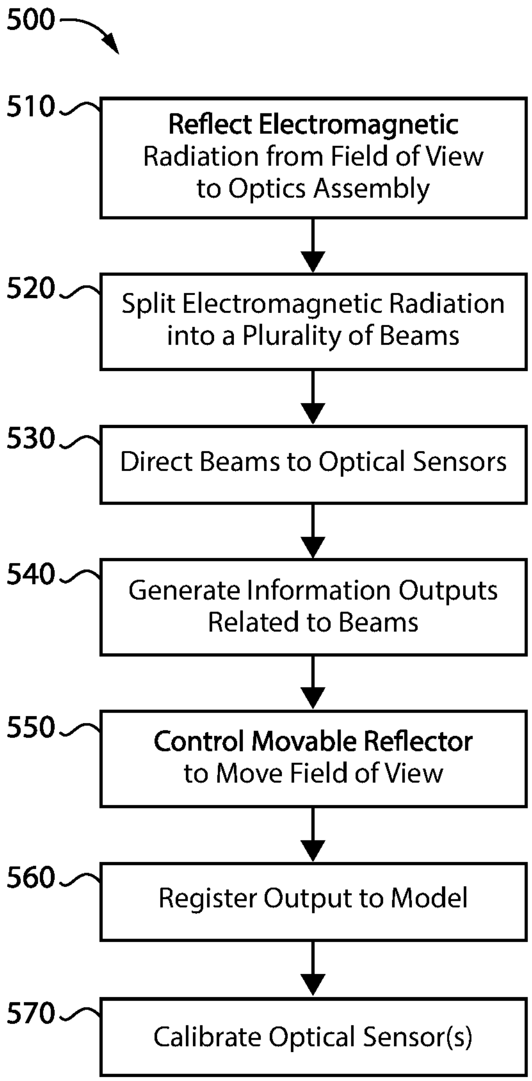

With additional reference to FIG. 8, an exemplary monitoring process 500 that may be performed using the system 90 and/or the monitoring assembly 200 is illustrated. As noted above, blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the system 90 and monitoring assembly 200 illustrated in FIGS.

1-5, it is to be appreciated that the process 500 may be performed with systems and/or monitoring assemblies having additional or alternative features.

As described herein, the process 500 generally involves monitoring one or more parameters relating to a moving FOV 202 within a region of interest in an AM machine such as the AM machine 100. The process 500 may, for example, be performed at a time when the AM machine 100 is manufacturing a workpiece 80 in a layer-by-layer fashion. For example, the AM machine 100 may scan a build beam 151 (e.g., an energy beam, a build material jet, or a binder jet) across a region of interest (e.g., a build plane or a build region) to add material to the workpiece 80 at a moving build point 159. As will be evident from the descriptions herein, the process 500 may be utilized to monitor one or more process parameters relating to the building of the workpiece 80.

The process 500 includes block 510, which generally involves reflecting electromagnetic radiation from a field of view in a region of interest of an additive manufacturing machine to an optics assembly. Block 510 may, for example, be performed by a movable reflector such as the movable reflector 240. In the illustrated form, block 510 involves reflecting EM radiation 204 from the FOV 202 on the build plane 104 of the AM machine 100 to the optics assembly 230.

The process 500 also includes block 520, which generally involves splitting the electromagnetic radiation into a plurality of beams, wherein each beam has a corresponding and respective wavelength range. Block 520 may be performed by a beam splitter of the optics assembly, such as the beam splitter 232 of the illustrated optics assembly 230. For example, block 520 may involve the beam splitter 232 splitting the EM radiation 204 reflected by the movable reflector 240 into a plurality of beams 206. In certain embodiments, two or more of the beams 206 may have the same wavelength range upon being split by the beam splitter 232. In certain embodiments, two or more of the beams 206 may have different wavelength ranges upon being split by the beam splitter 232.

The process 500 also includes block 530, which generally involves directing each beam of the plurality of beams to a corresponding and respective optical sensor of a plurality of optical sensors. Block 530 may, for example, be performed at least in part by the optics assembly 230 and/or at least in part by the lens benches 220. For example, the mirrors 234 of the optics assembly 230 may direct each beam 206 through the proximal end 228 of the corresponding lens bench 220 such that each lens bench 220 directs the corresponding beam 206 to the corresponding optical sensor 260. In directing the beams 206 to the optical sensors 260, one or more of the lens benches 220 may condition the corresponding beam 206 to a state more suitable for use with the corresponding optical sensor 260. In such forms, the lens benches 220 may be considered to comprise a portion of the optics assembly 230. As one example, one or more of the lens benches 220 may comprise one or more lenses 222 that aid in focusing the corresponding beam 206 on the sensing region 262 of the corresponding optical sensor 260. As another example, one or more of the lens benches 220 may comprise one or more filters 224 that filter one or more frequencies of EM radiation from the corresponding beam 206 before the beam 206 strikes the sensing region 262 of the corresponding optical sensor 260.

The process 500 also includes block 540, which generally involves generating a plurality of outputs, each output corresponding to a corresponding and respective beam. Block 540 may be performed at least in part by the plurality of optical sensors 260. For example, the first optical sensor **260*a* may generate output information related to the first beam 206*a*, and the second optical sensor 260*b* may generate output information related to the second beam 206*b*. While other forms are contemplated, in the illustrated embodiment, the plurality of optical sensors 260 generate the plurality of outputs contemporaneously. Due to the fact that each optical sensor 260 is receiving EM radiation from the same FOV 202, contemporaneous generation of output information enables the outputs to be registered to one another, which may facilitate comparison of the information output by the optical sensors 260**.

In certain embodiments, each output may be provided in the form of an information stream. In certain embodiments, such as those in which one or more of the optical sensors 260 has a high sampling rate, one or more information streams may have a correspondingly high refresh rate or temporal resolution. For example, some pyrometers 292 have a sampling rate of 100,000 samples per second or greater. In certain embodiments, such as those in which one or more of the optical sensors 260 has a relatively low sampling rate, one or more information streams may have a relatively low refresh rate or temporal resolution. For example, high-speed cameras 291 currently available generally have sampling rates of 250 to 10,000 frames per second. It is also contemplated that even lower sampling rates may be associated with an information stream, for example in embodiments in which sampling rate or temporal resolution is sacrificed in favor of image quality or spatial resolution.

In certain embodiments, two or more of the beams 206 may be substantially identical when received by the optical sensors 260. For example, each of the first beam **206*a* and the second beam 206*b* may have been subjected to the same conditioning (e.g., focusing and/or filtering) such that each beam 206*a*, 206*b* comprises or primarily comprises EM radiation within the same wavelength range. In certain embodiments, two or more of the beams 206 may be significantly different (e.g., of different wavelength bands) when received by the optical sensors 260. For example, the first beam 206*a* and the second beam 206*b* may have been split based on wavelength and/or subjected to different forms of conditioning (e.g., focusing and/or filtering) such that the first beam 206*a* and the second beam 206*b*** comprise or primarily comprise EM radiation within different wavelength ranges.

The process 500 also includes block 550, which generally involves controlling the movable reflector to move the field of view to maintain a predetermined relationship between the field of view and a moving build point within the region of interest. Block 550 may, for example, involve the control system 170 and/or the controller 250 operating the actuator 244 of the movable reflector 240 to move the mirror 242. For example, block 550 may involve the control system 170 and/or the controller 250 controlling the movable reflector 240 to move the FOV 202 to maintain a predetermined relationship between the FOV 202 and the moving build point 159, which is within the region of interest (e.g., the build plane 104). In various embodiments, to maintain a predetermined relationship between the FOV 202 and the moving build point 159 may comprise one or more of the following: maintaining the moving build point 159 within the FOV 202; maintaining the moving build point 159 within or adjacent the FOV 202; maintaining the moving build point 159 adjacent the FOV 202; maintaining the moving build point 159 outside the FOV 202. Further details on example methods by which the predetermined relationship between the FOV 202 and the build point 159 may be maintained are provided above with reference to FIG. 5.

In certain embodiments, the process 500 may include block 560, which generally involves registering at least one data point of at least one output of the plurality of outputs to a model of a workpiece being constructed by the moving build point. Block 560 may, for example, be performed by the control system 170 and/or the controller 250. By way of illustration, the control system 170 and/or the controller 250 may be provided with or otherwise have access to the model by which the workpiece 80 is being constructed, and may correlate the outputs generated by one or more of the optical sensors 260 with the location on the model that corresponds to the location of the build point 159 at the time that the output was generated. Further details regarding such registration and the potential benefits thereof are provided above with reference to FIG. 5.

In certain embodiments, the process 500 may include block 570, which generally involves calibrating at least one optical sensor of the plurality of optical sensors based upon a comparison of the output generated by the at least one optical sensor with the output generated by at least one other optical sensor of the plurality of optical sensors. Block 570 may, for example, be performed at least in part by the control system 170 and/or the controller 250. For example, if it is suspected that the first optical sensor 260*a* is generating biased or otherwise incorrect information, the first optical sensor 260*a* may be calibrated based upon a comparison of the output of the first optical sensor 260*a* with the output of the second optical sensor 260*b*. As noted above, the beams 206*a*, 206*b* can be provided as substantially identical when received at the optical sensors 260 (e.g., in embodiments in which the EM radiation 204 is split without regard to wavelength and the beams 206 are subjected to the same conditioning). Thus, in embodiments in which the beams 206*a*, 206*b* are substantially identical and the optical sensors 260*a*, 260*b* are substantially identical, the outputs of the optical sensors 260*a*, 260*b* should be substantially identical. A divergence in the outputs may be indicative of improper calibration of one or both optical sensors 260*a*, 260*b*, which may be rectified by calibrating the errant optical sensor 260 using another of the other optical sensors 260.

As noted above, the monitoring process 500 may, for example, be utilized to perform block 320 of the process 300. It is also contemplated that the process 500 may be utilized in connection with other processes (e.g., those in which the monitoring assembly 200 has been installed according to a method other than the installation process 400), or may be performed as a standalone process.

Figure 9:
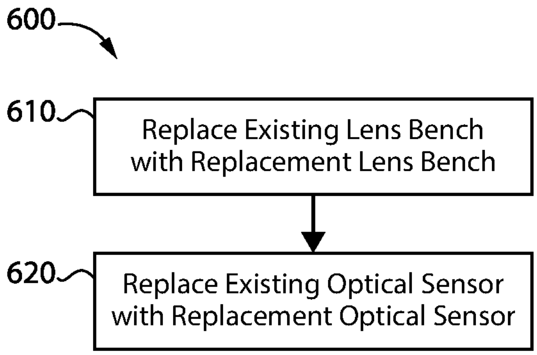

With additional reference to FIG. 9, an exemplary modification process 600 that may be performed using the monitoring assembly 200 is illustrated. As noted above, blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 600 is described herein with specific reference to the monitoring assembly 200 illustrated in FIGS. 1-4, it is to be appreciated that the process 600 may be performed with monitoring assemblies having additional or alternative features.

In certain circumstances, it may be desirable to exchange one or more of the lens benches 220 with another lens bench, such as a different configuration of lens bench. In such forms, the process 600 may include block 610, which generally involves replacing an existing lens bench 220 with a replacement lens bench. In certain embodiments, the replacement lens bench may have at least one characteristic different from the existing lens bench 220, such as length, presence and/or configuration of lens(es) 222, and/or presence and/or configuration of filter(s) 224.

In situations in which the lens bench 220 to be replaced is releasably secured to the optics assembly housing 231, block 610 may involve manipulating the proximal fittings 208 in a decoupling manner to remove the lens bench 220 from the housing 231. For example, in embodiments in which the fittings 208 comprise engaged threads, block 610 may involve rotating the lens bench 220 to unscrew the lens bench 220 from the optics assembly housing 231. With the existing lens bench 220 removed, the proximal end 228 of the replacement lens bench 220 may be coupled with the optics assembly housing 231 by manipulating the proximal fittings 208 in a coupling manner.

In situations in which the lens bench 220 to be replaced is releasably secured to the corresponding optical sensor housing 261 assembly housing 231, block 610 may involve manipulating the distal fittings 208 in a decoupling manner to remove the lens bench 220 from the optical sensor housing 261. For example, in embodiments in which the distal fittings 209 comprise engaged threads, block 610 may involve causing relative rotation of the lens bench 220 and the optical sensor 260 to unscrew the lens bench 220 from the optical sensor housing 261. With the existing lens bench 220 removed from the optical sensor 260, the distal end 229 of the replacement lens bench 220 may be coupled with the optical sensor housing 261 by manipulating the distal fittings 209 in a coupling manner. It is also contemplated that the replacement lens bench 220 may be coupled to a replacement optical sensor 260, for example in embodiments in which the process 600 involves block 620.

In certain circumstances, it may be desirable to exchange one or more of the optical sensors 260 with another optical sensor, such as a different configuration of optical sensor. In such forms, the process 600 may include block 620, which generally involves replacing an existing optical sensor 260 with a replacement optical sensor 260. In certain embodiments, the replacement optical sensor 260 may have at least one characteristic different from the existing lens bench 220, such as the type of optical sensor 260 (e.g., camera 291, pyrometer 292, photodiode 293, phototransistor 294, photoresistor 295), the wavelength band configured to be sensed by the optical sensor 260, the sampling rate of the optical sensor 260, and/or other characteristics.

In situations in which the optical sensor 260 to be replaced is releasably secured to the corresponding lens bench 220, block 620 may involve manipulating the distal fittings 209 in a decoupling manner to remove the optical sensor 260 from the lens bench 220. For example, in embodiments in which the fittings 209 comprise engaged threads, block 620 may involve causing relative rotation of the lens bench 220 and the optical sensor 260 to unscrew the lens bench 220 from the optical sensor housing 261. With the existing lens bench 220 removed, the distal end 229 of the existing lens bench 220 (or that of a replacement lens bench 220) may be coupled with the housing 261 of the replacement optical sensor 260 by manipulating the distal fittings 209 in a coupling manner.

As should be evident from the foregoing, certain embodiments of the systems and methods described herein provide a non-restrictive sensor interface 201 by which modular components of the monitoring assembly 200 can be replaced as warranted. Such modularity and ease of modification may provide the user with one or more advantages. For example, the systems and methods described herein may enable greater flexibility than traditional monitoring assemblies. By way of illustration, certain high-end cameras may cost upwards of a hundred thousand dollars, but can often be rented for a limited time at a fraction of that cost. As such, a group with limited resources may find it advantageous to rent the camera for a limited run of experiments. Upon being provided with the camera and an appropriately-configured lens bench, the group would be able to easily install and remove the rented camera for the limited duration of the experiments.

Given the above-noted cost associated with certain forms of optical sensors 260, an add-on kit 200' according to certain embodiments may not necessarily include the sensors 260. In certain forms, a kit 200' may be provided in a form that comprises the base plate 210, the optics assembly 230, the movable reflector 240, and the controller 250 as a modular unit. Such a modular unit may be installed to the AM machine 100, and the optical sensors 260 and/or the lens benches 220 may be rented out for use with the installed unit.

It should be appreciated that the systems and methods described herein may provide for repeatable calibration between in situ process-monitoring sensors and physics-based models. This objective may be achieved at least in part by the non-restrictive sensor interface (NRSI) 201 described above, which is an off-axis optical design that may, in certain embodiments, integrate commercial off-the-shelf, optical, in situ process monitoring sensors. This NRSI 201 may allow for two or more interchangeable sensors 260 to observe the region of interest at the same FOV 202. The scanner system of the NRSI 201 tracks the build point 159 to maintain a predetermined relationship between the FOV 202 and the build point 159. One result that may be provided is a system that synchronizes a pair of arbitrary optical sensors 260 such that they view a single FOV 202 surrounding the build point 159, using a common viewing angle. The NRSI system 201 is non-obtrusive, and may not necessarily require modifications to existing hardware of the AM machine 100. Also, unlike sensors placed in-line with the build beam 151, the NRSI 201 system may avoid affecting the build beam 151 (e.g., via thermal lensing) and/or obviate the many complications associated with using lossy mirrors.

Note that since the imaging FOV 202 may be on the order of $10^4$ times larger than the build point 159, the speed and agility required for the movable reflector 240 are far less demanding than for the galvanometer 160 for the energy beam 151. As a result, the in situ data may be collected at and around the build point 159 at all times, simplifying the registration of the in situ data to the build plan track vectors.

As noted above, the reflected EM radiation 204 will pass through a beam splitter 232, which will create a plurality of beams 206 of EM radiation (e.g., light). In certain embodiments, the beam splitter 232 may create two orthogonal beams 206 of light, one for imaging in the 0.4 μm to 2 μm waveband (VIS and SWIR), and the other for imaging in the 2 μm to 5 μm waveband (MWIR). Both beams 206 may pass through optics that enables Airy disk radius for imaging on the build plane to be 60 μm, 40 μm, and 12 μm in the MWIR, SWIR, and VIS wavebands, respectively. A folding mirror 234 may bend one beam 206 and orient it parallel to the other beam 206. These optical elements comprise aft optics, which will may be secured within an enclosure or housing 231. The egress for each beam may be a lens bench 220 to which a sensor 260 is connected.

Each lens bench 220 may be provided as a standard two-inch diameter optical tube that blocks stray light, and which may provide mounting locations where additional lenses may be inserted to focus the beam 206 as required by the particular optical sensor 260 being utilized. The lens benches 220 may be bolted to the optics enclosure 231 at the proximal end 228 and threaded onto the sensor housing 261 at the distal end 229.

As noted above, the movable reflector 240 may include a scanning motor 244 with an optical mirror 242 mounted on its shaft, and a detector 246 that provides feedback to the controller 250. In certain embodiments, the controller 250 may utilize a function generator with a square or sine wave output to emulate an input signal to activate the movable reflector 240 to traverse its range. A programmable voltage source may be used to emulate the movement of the build galvanometer 160 to trace the sequence of build plan track vectors.

It should be appreciated that the NRSI 201 comprising the movable reflector 240 and optics assembly 231 provides a reusable system for off-axis in situ sensing. An off-the-shelf sensor 260 may be connected to this system using a lens bench 220, and one or more of the sensors 260 can updated or exchanged as needed. Embodiments and modifications of this NRSI 201 may be usable with many forms of existing AM machines 100, and therefore may be of benefit to many parties.

In certain circumstances, it may be desirable to calibrate one or more of the sensors 260. Calibration of sensors, particularly of cameras such as IR cameras, has proven to be a difficult undertaking in the additive manufacturing realm. This difficulty arises due at least in part to the fact that conventional monitoring systems are “on-axis,” meaning that the observed radiation is reflected to a sensor via the same galvanometer that directs the beam from the generator to the build plane, and passes through the same optics assembly as the build beam. In passing through the same optics assembly as the build beam, the observation beam is conditioned in the same manner as the build beam, which prevents the sensor from receiving certain information. For example, when the optics assembly is configured to filter out EM radiation of a particular waveband from the build beam, EM radiation of the particular waveband will also be filtered from the observation beam. This prevents the sensor from sensing those wavelengths, resulting in tarnished data.

In contrast to the conventional “on-axis” sensing methods described above, certain embodiments of the present application relate to an “off-axis” sensing method. In the form illustrated in FIG. 1, for example, the build beam 151 passes through a first optics assembly 180 and is directed to the build surface by a first movable reflector 160, and the observation radiation 204 is directed to a second optics assembly 230 by a second movable reflector 240. As such, the conditioning applied to the beam 151 by the first optics assembly 180 does not affect the accuracy of the data of the observation radiation 204, which does not pass through the first optics assembly 180 on its path to the sensors 260.

Figure 10:
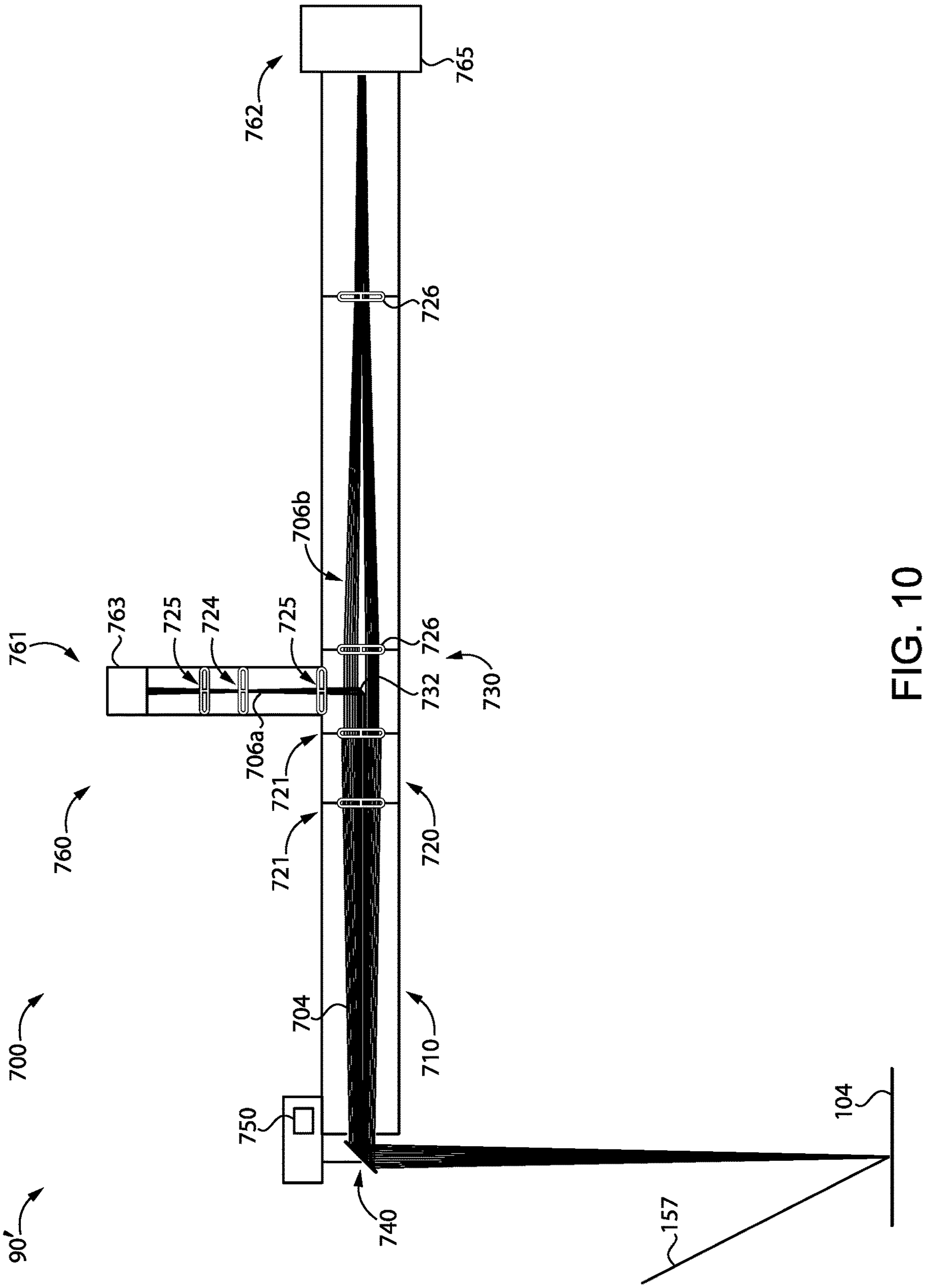
FIG. 10 is a schematic representation of a calibration assembly according to certain embodiments.

With additional reference to FIG. 10, illustrated therein is a schematic representation of a system 90' including a calibration assembly 700 according to certain embodiments. The calibration assembly 700 is configured for use with an AM machine such as the AM machine 100, which may also be considered to constitute a portion of the system 90' in certain embodiments. Alternatively, the calibration assembly 700 may be provided as a separate add-on assembly configured for use with the AM machine 100. As described herein, in certain embodiments, an assembly may be configurable between the arrangement illustrated in association with the assembly 200 and the arrangement illustrated in association with the assembly 700.

The calibration assembly 700 is somewhat similar to the above-described assembly 200, and similar reference characters are utilized to indicate similar elements and features. For example, the calibration assembly 700 generally includes a housing 710, a plurality of lens benches 720, an optics assembly 730, a movable reflector 740, a controller 750, and a plurality of sensors 760, which respectively correspond to the base plate 210, lens benches 220, optics assembly 230, movable reflector 240, controller 250, and sensors 260. In the interest of conciseness, the following description of the calibration assembly 700 focuses primarily on features that are different from those described above with reference to the assembly 200.

As described herein, the movable reflector 740 directs EM radiation 704 from the build plane 104 to the optics assembly 730, which splits the EM radiation 704 into a plurality of beams 206, each of which is directed to a corresponding and respective one of the sensors 760. More particularly, the optics assembly 730 splits the EM radiation 704 into a first beam 706*a* that is directed to a first sensor 761 (e.g., a spectrometer 763), and a second beam 706*b* that is directed to a second sensor 762 (e.g., a camera 765). As with the above-described embodiment, the lens benches 720 and/or the sensors 760 may be removably secured to a stationary object (e.g., the housing assembly 710) to facilitate removal and replacement of the components.

The plurality of lens benches 720 may aid in conditioning the EM radiation 704 to a form conducive for sensing by one or more of the sensors 760. In the illustrated form, the lens benches 720 include one or more collimating lenses 721, which may, for example, be positioned upstream of the optics assembly 730. The plurality of lens benches 720 may additionally or alternatively include one or more lenses downstream of the optics assembly 730, which splits the EM radiation 704 into a first beam 706*a* and a second beam 706*b*.

In certain embodiments, the lens benches 720 may include one or more lens benches for modulating the first beam 706*a*. For example, the assembly 700 may include a spatial filter 724 and/or one or more spectrometer lenses 725. While other arrangements are contemplated, in the illustrated form, the assembly 700 includes two spectrometer lenses 725, and the spatial filter 724 is positioned between the spectrometer lenses 725. In certain embodiments, the lens benches 720 may include one or more lens benches for modulating the second beam 706*b*. For example, the assembly 700 may include one or more focusing lenses 726 to focus the radiation for sensing by the second sensor 762.

The optics assembly 730 includes a splitter 732 configured to split the EM radiation 704 into a plurality of beams 706, including a first beam 706*a* and a second beam 706*b*. In certain embodiments, the splitter 732 may be configured to direct substantially all light from only a portion of the EM radiation beam 704 toward the first sensor 761. For example, the splitter 732 may take the form of a full-silvered mirror having an effective area less than the total cross-sectional area of the EM radiation 704 such that only a portion of the EM radiation 704 is directed toward the first sensor 761. It is also contemplated that the splitter 732 may be configured to direct to the first sensor 761 only a portion of the EM radiation 704 that encounters the splitter 732. For example, the splitter 732 may be a half-silvered mirror through which a portion of the EM radiation 704 passes as the second beam 706*b*. Moreover, the splitter 732 may selectively direct one or more bands of EM radiation to the first sensor 761 and/or the second sensor 762, for example based upon the frequency or wavelength of the radiation. As one example, EM radiation with a frequency below a threshold value may be directed to one of the first sensor 761 or the second sensor 762, and EM radiation with a frequency above the threshold value may be directed to the other of the first sensor 761 or the second sensor 762.

In certain embodiments, the splitter 732 may be movably mounted in the housing 710. As one example, the splitter 732 may have a deployed position in which the splitter 732 is operable to direct EM radiation 704 toward the first sensor 761, and a stored position in which the splitter 732 does not substantially impinge on the passage of EM radiation 704 from the movable reflector 740 to the second sensor 762. In certain embodiments, the splitter 732 may be manually movable between the deployed position and the stored position. Additionally or alternatively, the assembly 700 may include an electrically-operable actuator operable to move the splitter 732 between the deployed position and the stored position.

Figure 11:
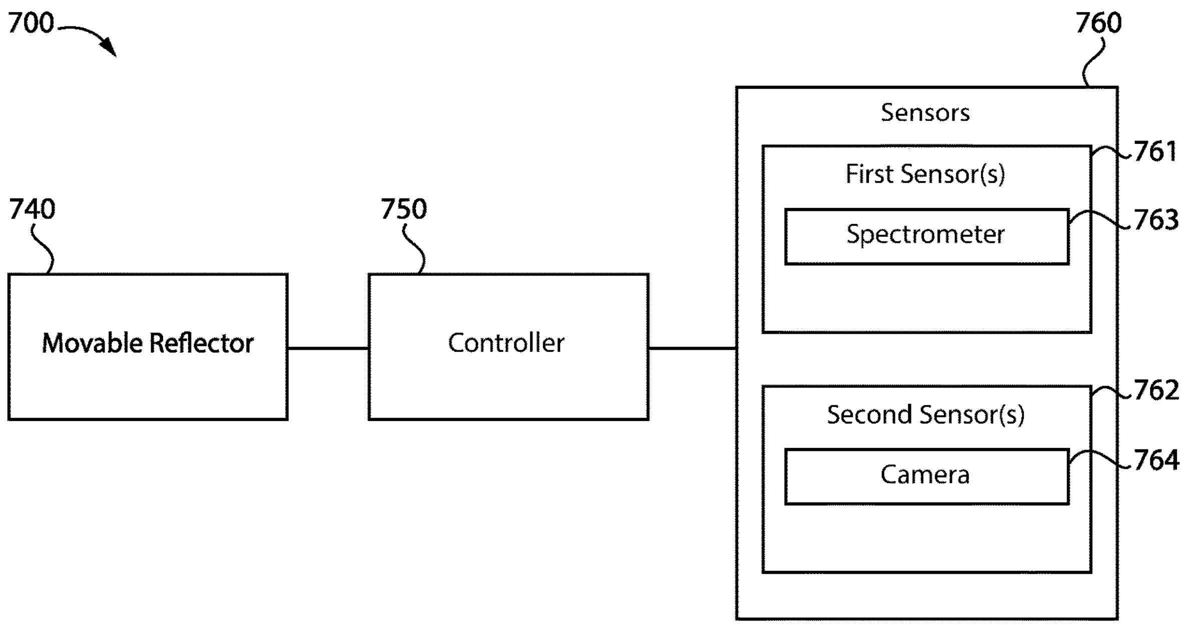
FIG. 11 is a schematic block diagram of the calibration assembly illustrated in FIG. 10.

With additional reference to FIG. 11, the movable reflector 740 may be in communication with the controller 750 such that the controller 750 is operable to control operation of the movable reflector 740. The controller 750 may additionally or alternatively be in communication with the sensors 760, such as the first sensor 761 and/or the second sensor 762. While other forms are contemplated, in the illustrated embodiment, the first sensor 761 comprises a spectrometer 763, and the second sensor 762 comprises a camera 765. In certain forms, the camera 765 may be provided in the form of an IR camera, such as a camera configured to capture image information for NIR radiation, SWIR radiation, MWIR radiation, and/or LWIR radiation.

As set forth above, the above-described assembly 200 may be utilized to perform a process 500 that involves calibrating one optical sensor based upon the output of another optical sensor of the same configuration. While the assembly 700 may likewise be utilized to calibrate one sensor based upon the output of another sensor of the same configuration, in the illustrated form, the first sensor 761 and the second sensor 762 are of different configurations. More particularly, in the illustrated form, the first sensor 761 comprises a spectrometer 763, and the second sensor 762 comprises a camera 765. As described herein, the information generated by the spectrometer 763 may be utilized to calibrate the information generated by the camera 765.

Figure 12:
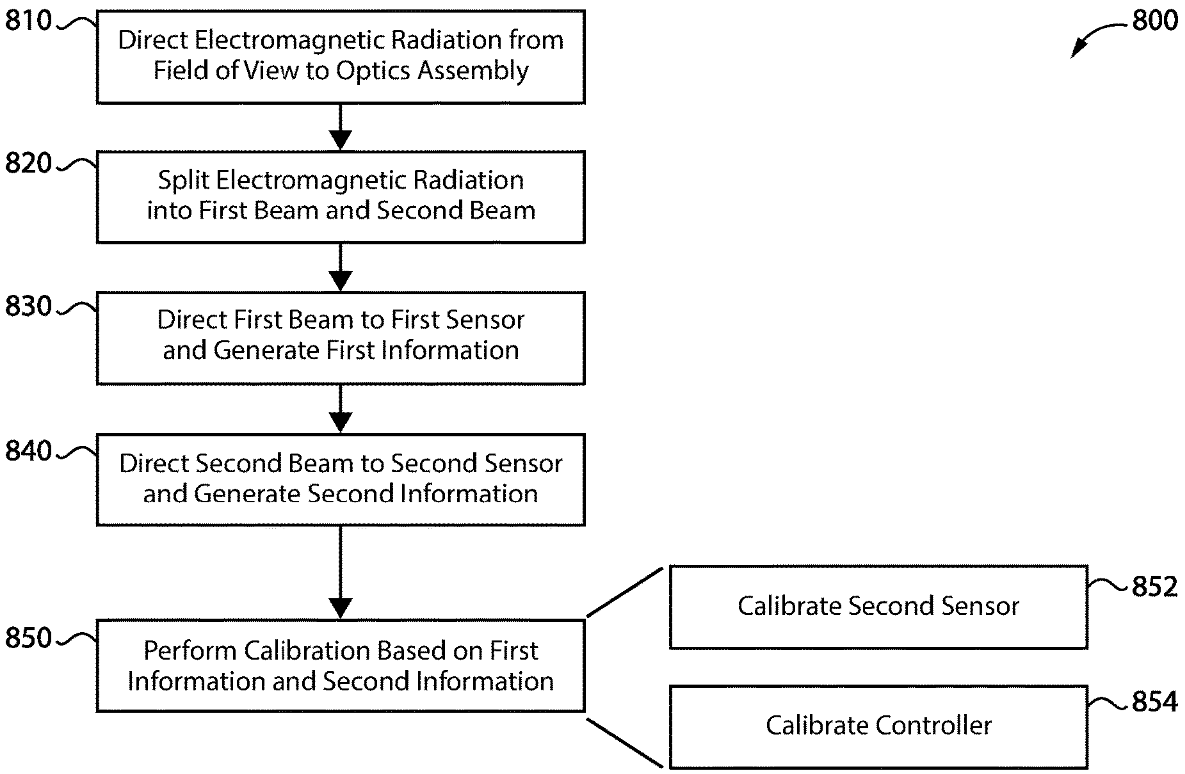
FIG. 12 is a schematic flow diagram of a process according to certain embodiments.

With additional reference to FIG. 12, an exemplary monitoring process 800 that may be performed using the system 90' and/or the calibration assembly 700 is illustrated. As noted above, blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 800 is described herein with specific reference to the system 90' and calibration assembly 700 illustrated in FIGS. 10 and 11, it is to be appreciated that the process 800 may be performed with systems and/or calibration assemblies having additional and/or alternative features.

The process 800 may include block 810, which generally involves directing electromagnetic radiation from a field of view within a region of interest to an optics assembly. For example, block 810 may involve reflecting, by a movable reflector 740, EM radiation 704 from the build plane 104 to the optics assembly 730. In certain embodiments, such as those in which the AM process is being performed during the calibration process 800, block 810 may involve moving the reflector 740 to maintain a desired relationship between the build point and the field of view, for example as described above. In certain forms, the control of the moving reflector 740 may be performed at least in part by the controller 750.

The process 800 may include block 820, which generally involves splitting the electromagnetic radiation into a first beam and a second beam. For example, block 820 may involve splitting, by the optics assembly 730, the radiation 704 into a plurality of beams 706 including a first beam 706*a* and a second beam 706*b*. In certain forms, the splitting of block 820 may involve splitting the EM radiation 704 based upon wavelength/frequency. In certain forms, the splitting of block 820 may involve forming the first beam 706*a* (or the second beam 706*b*) of substantially all EM radiation 704 that encounters the splitter 732 (e.g., in embodiments in which the splitter 732 comprises a full-silvered mirror).

The process 800 may include block 830, which generally involves directing the first beam to a first sensor and generating, by the first sensor, first information related to the first beam. For example, block 830 may involve directing the first beam 706*a* to the first sensor 761 to thereby cause the first sensor 761 to generate the first information. For example, in embodiments in which the first sensor 761 comprises a spectrometer 763, the first information may comprise spectroscopic information. An illustrative spectrograph 790 is illustrated in FIG. 13 and described in further detail herein.

The process 800 may include block 840, which generally involves directing the second beam to a second sensor and generating, by the second sensor, second information related to the second beam. For example, block 840 may involve directing the second beam 706*b* to the second sensor 762 to thereby cause the second sensor 762 to generate the second information. For example, in embodiments in which the second sensor 761 comprises a camera, the second information may comprise a digital image.

The process 800 may include block 850, which generally involves performing a calibration based upon the first information and the second information. In certain embodiments, block 850 may include block 852, which generally involves calibrating the second sensor. Additionally or alternatively, block 850 may include block 854, which generally involves calibrating a controller.

Figure 13:
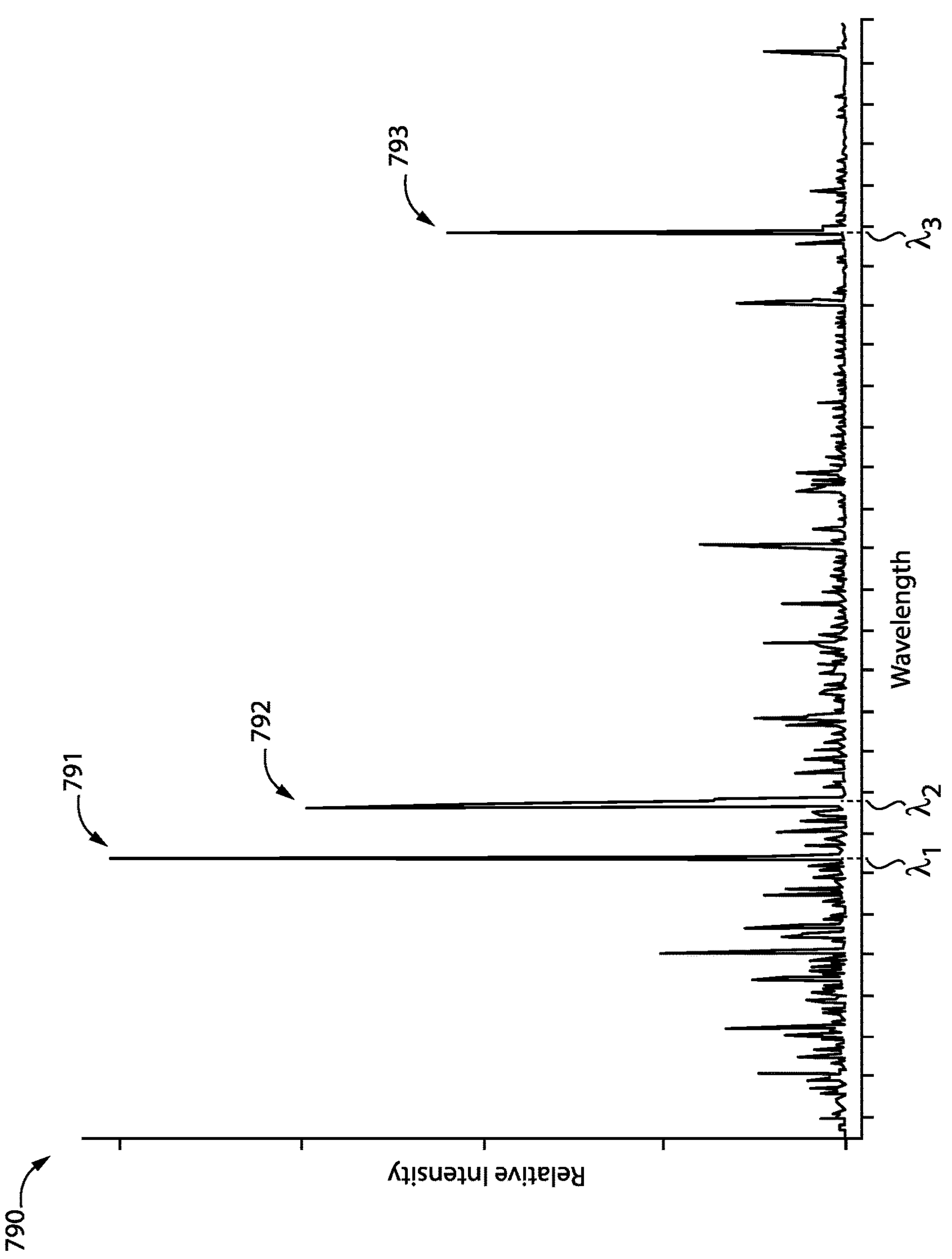
FIG. 13 is an example graph illustrating intensity versus wavelength.

With additional reference to FIG. 13, block 852 may involve calibrating the second sensor based on the first information and the second information. As noted above, FIG. 13 is an example spectrograph 790 used for purposes of illustration. The spectrograph 790 includes a plurality of peaks, each of which corresponds to the relative intensity of a particular wavelength of EM radiation received by the spectrometer 763. For example, the illustrative spectrograph 790 includes a highest peak 791 at a first wavelength $\lambda_1$, a second-highest peak 792 at a second wavelength $\lambda_2$, and a third-highest peak 793 at a third wavelength $\lambda_3$.

As will be appreciated by those skilled in the art, calibration of an infrared camera often involves using the camera to capture an image of a black body object that has a known temperature, and thus emits radiation of a known wavelength corresponding to the known temperature. With the wavelength of the EM radiation being known, the image information can be calibrated based upon the known wavelength of the black body EM radiation.

As noted above, the first information (e.g., spectroscopic information generated by the spectrometer 763) may be utilized in combination with the second information (e.g., digital image information generated by the camera 765) to calibrate the second sensor 762 (e.g., the camera 765). For example, calibration of the camera 765 may involve comparing spectroscopic information generated by the spectrometer 763 for a particular point in time t to the digital image information generated by the camera 765 for the particular point in time t. With the wavelengths corresponding to the spectrographic peaks being known based on the spectroscopic first information, the camera 765 may be calibrated according to known techniques. In certain forms, the calibration may involve calibrating the camera 765 such that a particular value of the image information is set to correspond to a wavelength known from the first information. By way of illustration, if the spectroscopic information indicates that the highest peak 791 occurs at a first particular wavelength $\lambda_1$ and the image information indicates that the highest peak should instead occur at a second particular wavelength $\lambda_1'$, block 850 may involve calibrating the camera 765 based on the relationship between the first particular wavelength $\lambda_1$ and the second particular wavelength $\lambda_1'$.

In certain embodiments, such as those in which the process 800 includes block 852, calibration of the second sensor 762 (e.g., the camera 765) may involve calibrating the second sensor 762 itself such that the digital image information generated by the camera 765 is calibrated prior to receipt by the controller 750. It is also contemplated that the calibration block 850 may include block 854, which generally involves calibrating the controller 750. Calibrating the controller 750 may, for example, involve configuring the controller 750 to generate calibrated image information after generation of the initial image information. Stated another way, the calibrating of block 850 may involve calibrating the controller 750 based on the first information and the second information such that the controller receives uncalibrated information and outputs calibrated information. By way of illustration, the calibration may involve receiving an uncalibrated data point (e.g., corresponding to a particular pixel) having a value of X, and applying one or more rules and/or performing one or more operations to generate a calibrated data point having the value of X'. The controller 750 may then generate one or more images based upon the calibrated data points.

In the embodiments illustrated and described thus far, the monitoring assembly 200 and the calibration assembly 700 are illustrated as separate embodiments. However, it should be appreciated that these assemblies may be utilized in connection with one another, or that a system may be configurable between the two configurations.

Figure 14:
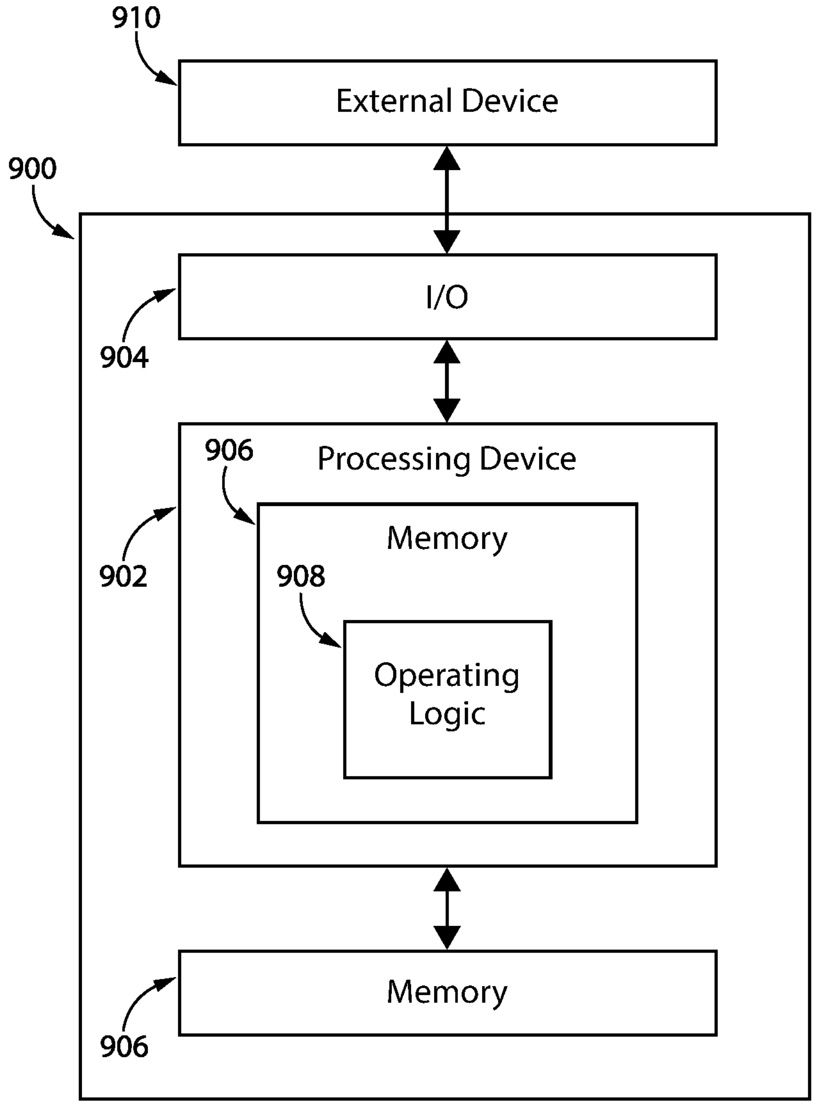
FIG. 14 is a schematic block diagram of a computing device that may be utilized in connection with certain embodiments.

Referring now to FIG. 14, a simplified block diagram of at least one embodiment of a computing device 900 is shown. The illustrative computing device 900 depicts at least one embodiment of a control system or controller that may be utilized in connection with the control system 170 and/or controller 250 illustrated in FIGS. 1-4, in addition or as an alternative to the controller 750 illustrated in FIGS. 10 and 11.

Depending on the particular embodiment, the computing device 900 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 900 includes a processing device 902 that executes algorithms and/or processes data in accordance with operating logic 908, an input/output device 904 that enables communication between the computing device 900 and one or more external devices 910, and memory 906 which stores, for example, data received from the external device 910 via the input/output device 904.

The input/output device 904 allows the computing device 900 to communicate with the external device 910. For example, the input/output device 904 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 900. The input/output device 904 may include hardware, software, and/or firmware suitable for performing the techniques described herein.

The external device 910 may be any type of device that allows data to be inputted or outputted from the computing device 900. For example, in various embodiments, the external device 910 may be embodied as the build table 120, the powder distributor 130, the reservoir 140, the beam generator 150, the mirror galvanometer 160, movable reflector 240, the optical sensors 260, the movable reflector 740, and/or one or more of the sensors 760. Further, in some embodiments, the external device 910 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 910 may be integrated into the computing device 900.

The processing device 902 may be embodied as any type of processor(s) capable of performing the functions described herein. In particular, the processing device 902 may be embodied as one or more single or multi-core processors, microcontrollers, or other processor or processing/controlling circuits. For example, in some embodiments, the processing device 902 may include or be embodied as an arithmetic logic unit (ALU), central processing unit (CPU), digital signal processor (DSP), and/or another suitable processor(s). The processing device 902 may be a programmable type, a dedicated hardwired state machine, or a combination thereof. Processing devices 902 with multiple processing units may utilize distributed, pipelined, and/or parallel processing in various embodiments. Further, the processing device 902 may be dedicated to performance of just the operations described herein, or may be utilized in one or more additional applications. In the illustrative embodiment, the processing device 902 is of a programmable variety that executes algorithms and/or processes data in accordance with operating logic 908 as defined by programming instructions (such as software or firmware) stored in memory 906. Additionally or alternatively, the operating logic 908 for processing device 902 may be at least partially defined by hardwired logic or other hardware. Further, the processing device 902 may include one or more components of any type suitable to process the signals received from input/output device 904 or from other components or devices and to provide desired output signals. Such components may include digital circuitry, analog circuitry, or a combination thereof.

The memory 906 may be of one or more types of non-transitory computer-readable media, such as a solid-state memory, electromagnetic memory, optical memory, or a combination thereof. Furthermore, the memory 906 may be volatile and/or nonvolatile and, in some embodiments, some or all of the memory 906 may be of a portable variety, such as a disk, tape, memory stick, cartridge, and/or other suitable portable memory. In operation, the memory 906 may store various data and software used during operation of the computing device 900 such as operating systems, applications, programs, libraries, and drivers. It should be appreciated that the memory 906 may store data that is manipulated by the operating logic 908 of processing device 902, such as, for example, data representative of signals received from and/or sent to the input/output device 904 in addition to or in lieu of storing programming instructions defining operating logic 908. As illustrated, the memory 906 may be included with the processing device 902 and/or coupled to the processing device 902 depending on the particular embodiment. For example, in some embodiments, the processing device 902, the memory 906, and/or other components of the computing device 900 may form a portion of a system-on-a-chip (SoC) and be incorporated on a single integrated circuit chip.

In some embodiments, various components of the computing device 900 (e.g., the processing device 902 and the memory 906) may be communicatively coupled via an input/output subsystem, which may be embodied as circuitry and/or components to facilitate input/output operations with the processing device 902, the memory 906, and other components of the computing device 900. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 900 may include other or additional components, such as those commonly found in a typical computing device (e.g., various input/output devices and/or other components), in other embodiments. It should be further appreciated that one or more of the components of the computing device 900 described herein may be distributed across multiple computing devices. In other words, the techniques described herein may be employed by a computing system that includes one or more computing devices. Additionally, although only a single processing device 902, I/O device 904, and memory 906 are illustratively shown in FIG. 14, it should be appreciated that a particular computing device 900 may include multiple processing devices 902, I/O devices 904, and/or memories 906 in other embodiments. Further, in some embodiments, more than one external device 910 may be in communication with the computing device 900.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method performed while an additive manufacturing machine directs a build beam along a build beam path from a build beam generator to a moving build point within a region of interest, the method comprising:

reflecting, by a movable reflector, electromagnetic radiation from a field of view in the region of interest to an optics assembly, wherein the movable reflector is positioned outside the build beam path such that the build beam is not affected by the movable reflector as the build beam travels along the build beam path from the build beam generator to the moving build point;

moving the movable reflector relative to the optics assembly to thereby maintain a predetermined relationship between the moving build point and the field of view;

splitting, by the optics assembly, the electromagnetic radiation into a plurality of beams, the plurality of beams including a first beam and a second beam;

directing the first beam to a first sensor, thereby causing the first sensor to generate first information regarding the first beam;

directing the second beam to a second sensor having a different configuration from the first sensor, thereby causing the second sensor to generate second information regarding the second beam; and calibrating the second sensor based upon the first information and the second information.

2. The method of claim 1, wherein splitting the electromagnetic radiation into a plurality of beams comprises reflecting a portion of the electromagnetic radiation.

3. The method of claim 2, wherein reflecting a portion of the electromagnetic radiation comprises reflecting the portion of the electromagnetic radiation with a full-silvered mirror.

4. The method of claim 2, wherein reflecting a portion of the electromagnetic radiation comprises selectively reflecting the portion of the electromagnetic radiation based upon a wavelength of the electromagnetic radiation.

5. The method of claim 1, wherein the first sensor comprises a spectrometer.

6. The method of claim 5, wherein the calibrating comprises calibrating the second sensor based at least in part upon spectrometry information generated by the spectrometer.

7. The method of claim 6, wherein the second sensor comprises a camera.

8. The method of claim 1, wherein the build beam comprises an energy beam;

wherein the method further comprises reflecting the energy beam by an additional movable reflector and passing the energy beam through an additional optics assembly prior to the energy beam striking the build point; and wherein the energy beam does not pass through the optics assembly as the energy beam travels along the build beam path.

9. The method of claim 1, wherein the build beam comprises an energy beam that passes through a first lens that partially defines the build beam path;

wherein the method further comprises passing the electromagnetic radiation through a second lens;

wherein the electromagnetic radiation reflected by the movable reflector does not pass through the first lens; and wherein the energy beam does not pass through the second lens.

10. The method of claim 1, further comprising maintaining the first sensor and the second sensor in fixed positions relative to the additive manufacturing machine while moving the movable reflector.

11. The method of claim 1, wherein to maintain the predetermined relationship between the moving build point and the field of view comprises tracking movement of the moving build point.

12. The method of claim 1, wherein to maintain the predetermined relationship between the moving build point and the field of view comprises maintaining the moving build point at a predetermined location relative to the field of view.

13. A system, comprising:

an additive manufacturing machine configured to selectively scan an energy beam across a region of interest to thereby add material to a workpiece at a moving build point located in the region of interest, wherein the additive manufacturing machine defines an energy beam path along which the energy beam travels from an energy beam generator to the moving build point, and wherein the additive manufacturing machine comprises a first movable reflector at least partially defining the energy beam path;

a second movable reflector configured to direct electromagnetic radiation emitted from a field of view in the region of interest to an optics assembly, wherein the second movable reflector is positioned outside the energy beam path such that the energy beam is not affected by the second movable reflector as the energy beam travels along the energy beam path;

the optics assembly, wherein the optics assembly is configured to separate the electromagnetic radiation reflected by the second movable reflector into a first beam and a second beam;

a first sensor configured to receive the first beam and to generate first information related to the first beam;

a second sensor configured to receive the second beam and to generate second information related to the second beam, wherein the first sensor and the second sensor are of different configurations; and a control system configured to control movement of the second movable reflector to maintain a predetermined relationship between the field of view and the moving build point, wherein the control system is further configured to calibrate the second sensor based upon the first information and the second information.

14. The system of claim 13, wherein the first sensor comprises a spectrometer.

15. The system of claim 14, wherein the second sensor comprises a camera.

16. The system of claim 13, further comprising an additional optics assembly;

wherein the additional optics assembly is positioned within the energy beam path such that the energy beam passes through the additional optics assembly; and wherein the electromagnetic radiation reflected by the second movable reflector and separated by the optics assembly does not pass through the additional optics assembly.

17. The system of claim 13, further comprising an additional optics assembly through which the energy beam path passes;

wherein the additional optics assembly is positioned such that electromagnetic radiation reflected by the second movable reflector does not pass through the additional optics assembly.

18. An add-on kit for an additive manufacturing machine configured to direct an energy beam along an energy beam path to a moving build point in a region of interest to thereby add material to a workpiece at the moving build point, wherein the additive manufacturing machine comprises a first movable reflector partially defining the energy beam path and a first optics assembly positioned along the energy beam path, the add-on kit comprising:

a second optics assembly configured to separate electromagnetic radiation emitted from the region of interest into a first beam and a second beam, wherein the first beam is directed to a first sensor configured to receive the first beam and to generate first information related to the first beam, and wherein the second beam is directed to a second sensor configured to receive the second beam and to generate second information related to the second beam;

a second movable reflector configured to reflect electromagnetic radiation from within a field of view to the second optics assembly such that each of the first beam and the second beam comprises electromagnetic radiation from the field of view; and a controller configured to calibrate the second sensor based upon the first information and the second information;

wherein the first sensor and the second sensor are of different configurations;

wherein the add-on kit is configured for installation at a location in which the energy beam is affected by neither the second optics assembly nor the second movable reflector as the energy beam travels along the energy beam path; and wherein the controller is further configured to move the second movable reflector to maintain a predetermined relationship between the moving build point and the field of view.

19. The add-on kit of claim 18, further comprising each of the first sensor and the second sensor.

20. The add-on kit of claim 19, wherein the first sensor comprises a spectrometer.

21. The add-on kit of claim 19, wherein the second sensor comprises a camera.

22. A method of using the add-on kit of claim 19, the method comprising installing the add-on kit such that the energy beam is affected by neither the second optics assembly nor the second movable reflector as the energy beam travels along the energy beam path.

* * * * *